(12) United States Patent
Herlin et al.

(10) Patent No.: US 12,078,314 B2
(45) Date of Patent: Sep. 3, 2024

(54) AUTOMOTIVE LIGHTING APPLIANCE AND RELATIVE MANUFACTURING METHOD

(71) Applicant: Marelli Automotive Lighting Italy S.p.A. Con Socio Unico, Venaria Reale (IT)

(72) Inventors: Jean-Pascal Herlin, Venaria Reale (IT); Michele Antonipieri, Tolmezzo (IT); Riccardo Mestriner, Tolmezzo (IT)

(73) Assignee: Marelli Automotive Lighting Italy S.P.A. Con Socio Unico, Venaria Reale (IT)

( * ) Notice: Subject to any disclaimer, the term of this patent is extended or adjusted under 35 U.S.C. 154(b) by 0 days.

(21) Appl. No.: 18/137,560

(22) Filed: Apr. 21, 2023

(65) Prior Publication Data
US 2024/0044471 A1  Feb. 8, 2024

(30) Foreign Application Priority Data

Apr. 22, 2022  (EP) .................................. 22169562.0

(51) Int. Cl.
*F21S 43/19* (2018.01)
*F21S 43/14* (2018.01)

(52) U.S. Cl.
CPC ............. *F21S 43/195* (2018.01); *F21S 43/14* (2018.01)

(58) Field of Classification Search
CPC ................................ F21S 43/195; F21S 43/14
See application file for complete search history.

(56) References Cited

U.S. PATENT DOCUMENTS

| 5,436,038 A | 7/1995 | Brassier et al. |
| 11,624,488 B1* | 4/2023 | Sugiyama ............. F21S 43/195 362/545 |
| 2015/0003083 A1 | 1/2015 | Uehara |
| 2020/0386390 A1* | 12/2020 | Chen ........................ F21S 4/24 |
| 2021/0170940 A1* | 6/2021 | Kwon .................. B60Q 11/007 |
| 2022/0017011 A1* | 1/2022 | Franke ..................... B60Q 3/62 |
| 2023/0036850 A1* | 2/2023 | Olsen ................... B60Q 1/2615 |
| 2023/0294594 A1* | 9/2023 | Thomas ................ H05B 45/60 315/77 |

FOREIGN PATENT DOCUMENTS

| CN | 111878779 A | 11/2020 |
| CN | 112911749 A | 6/2021 |
| CN | 214874581 U | 11/2021 |
| CN | 215216038 U | 12/2021 |
| FR | 3097981 A1 | 1/2021 |
| FR | 3114633 A1 | 4/2022 |
| WO | WO 2021/110332 A1 | 6/2021 |

OTHER PUBLICATIONS

European Search Report dated Sep. 9, 2022 for Euroean Application No. 22169562.0.

* cited by examiner

*Primary Examiner* — Christopher E Dunay
(74) *Attorney, Agent, or Firm* — McCarter & English, LLP

(57) ABSTRACT

Automotive lighting appliance including an internal wall and a mini-LED lighting device which is coupled to the internal wall and includes a support circuit board formed by one or more support portions and a plurality of flat plate-shaped mini-LED electronic modules, which are firmly coupled to the support portions of the support circuit board, next to each other, so as to form a light emitting surface adapted to emit light.

16 Claims, 17 Drawing Sheets

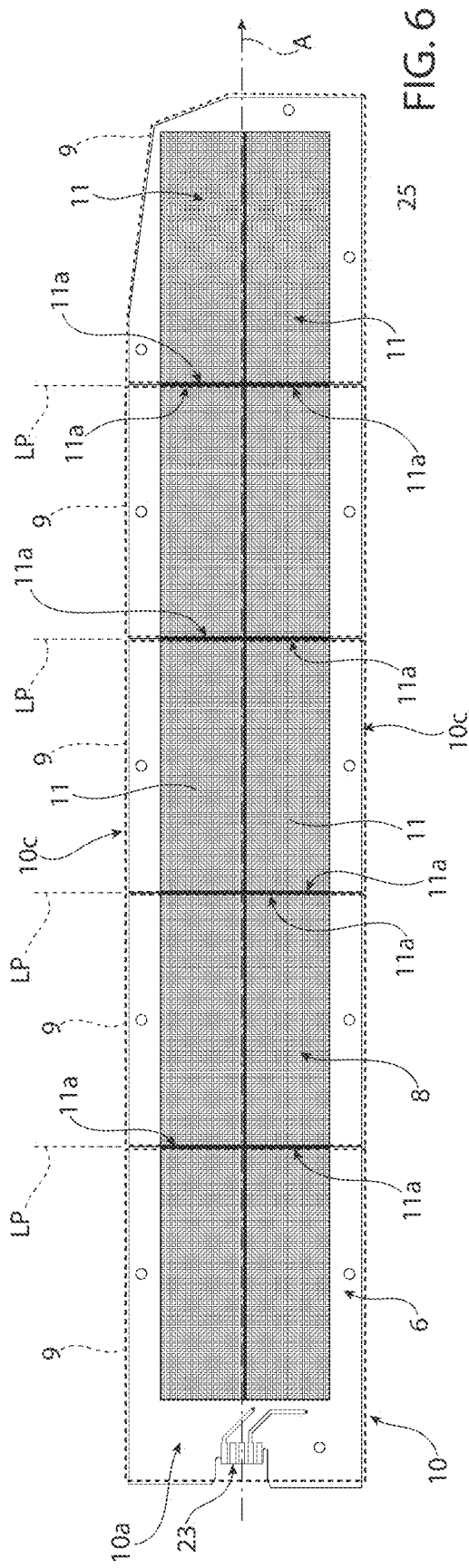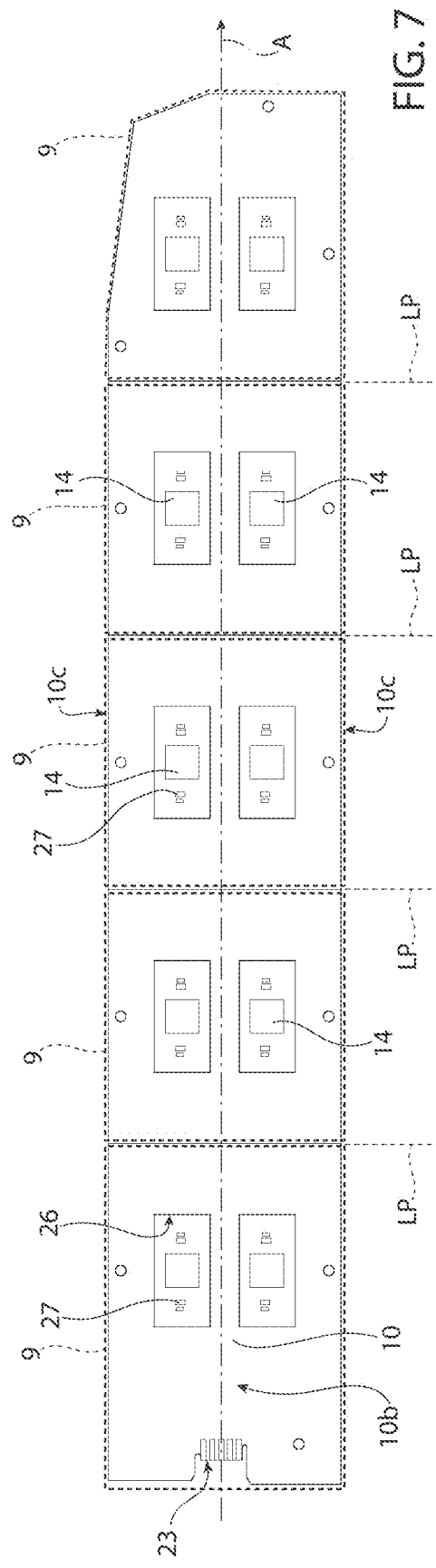

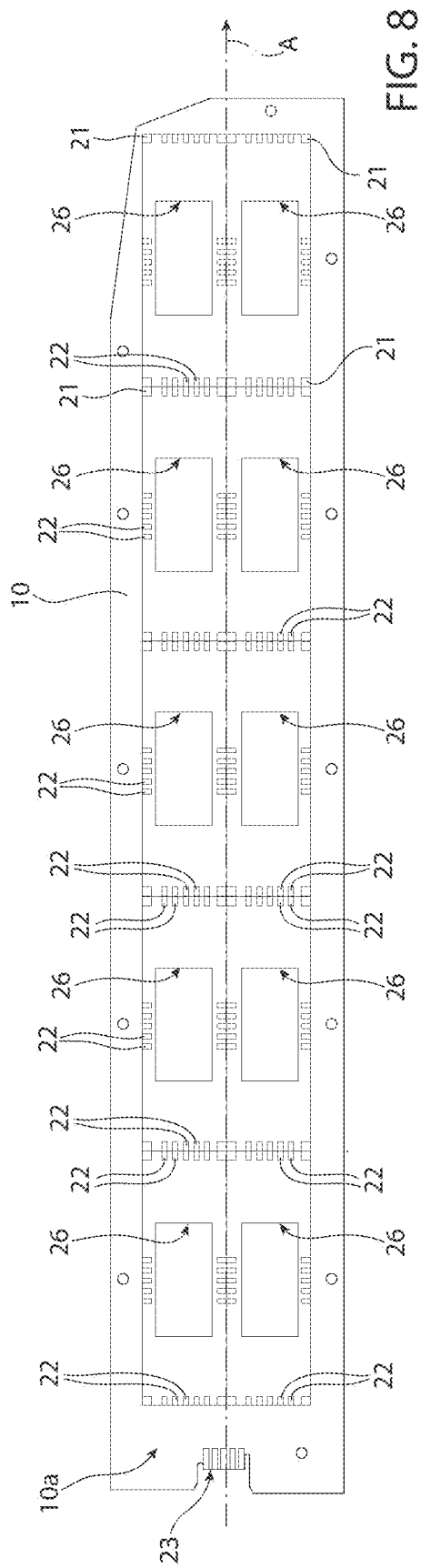
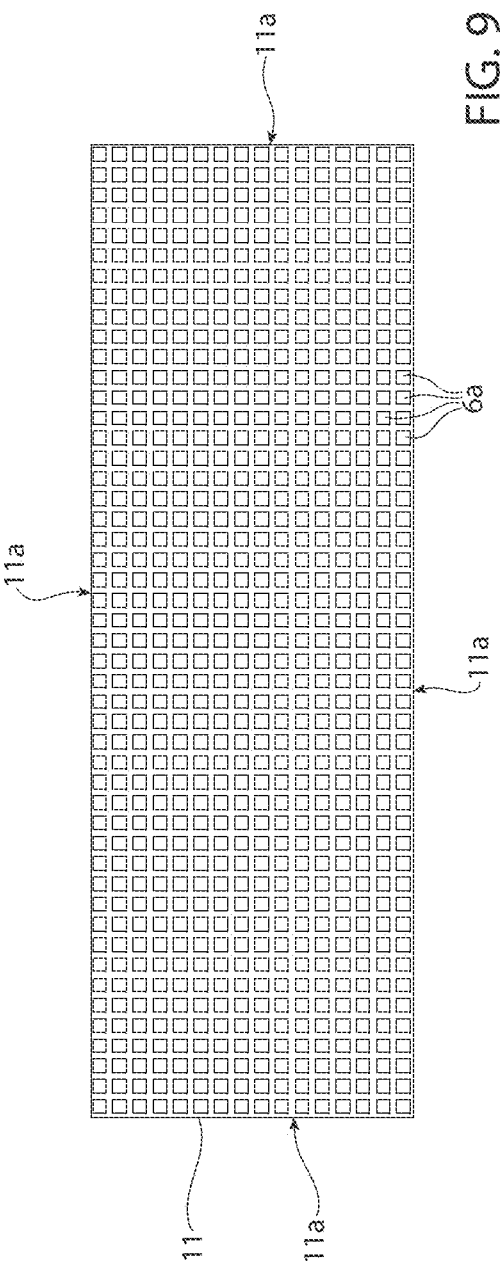
FIG. 8
FIG. 9

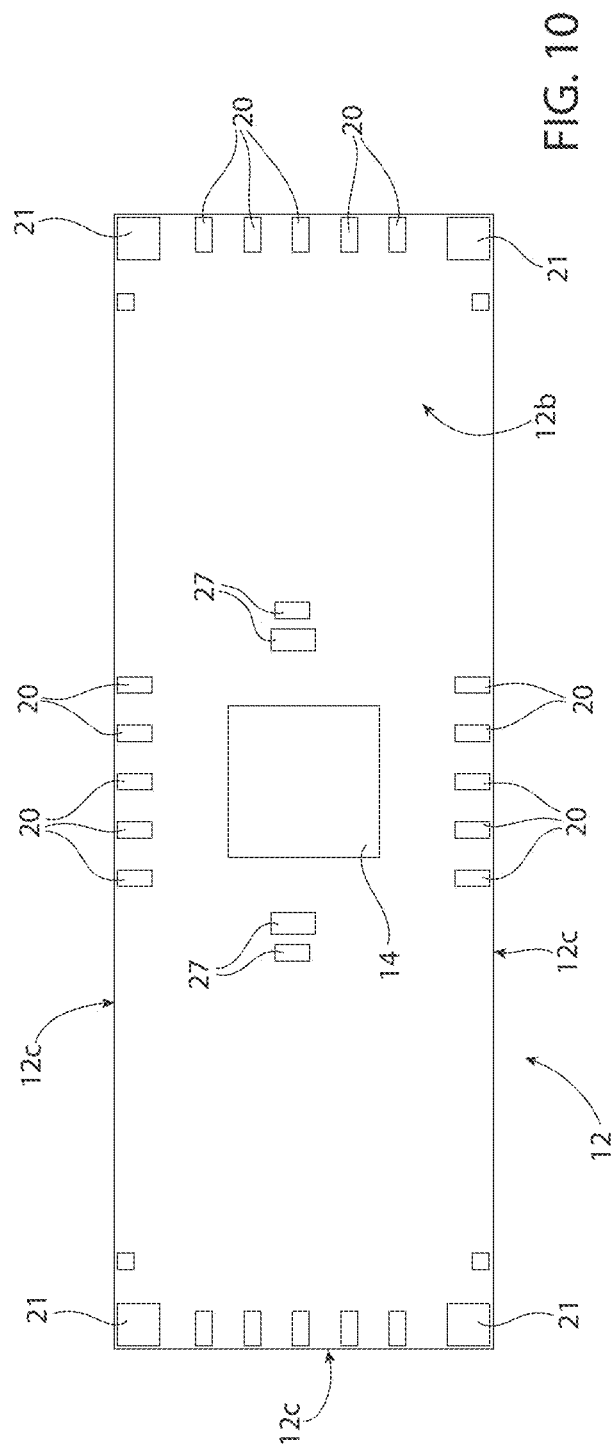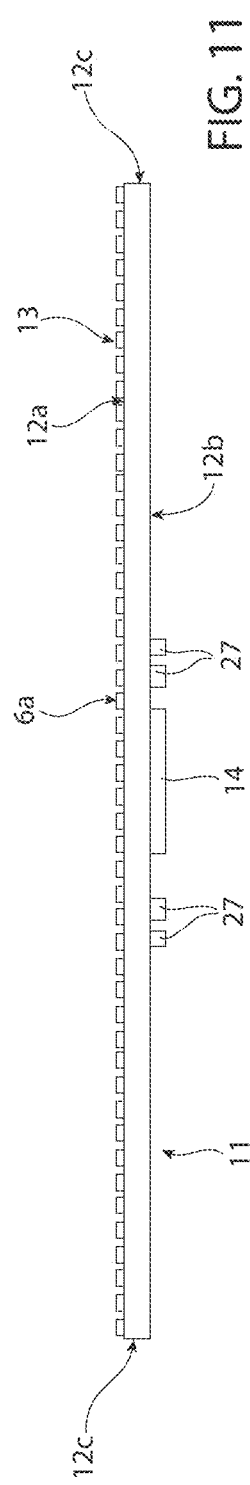

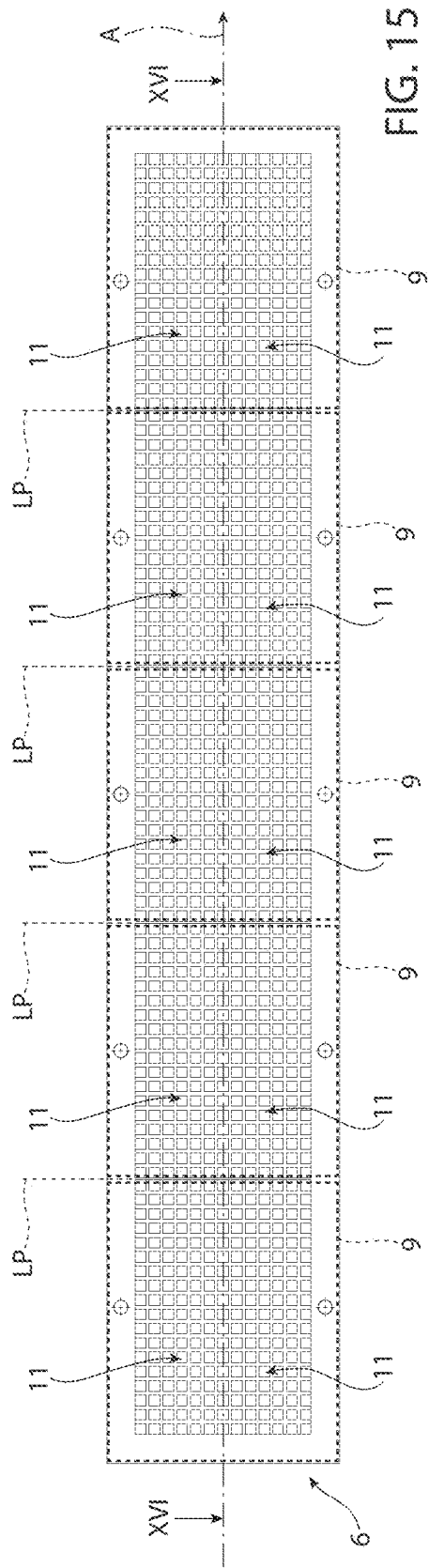
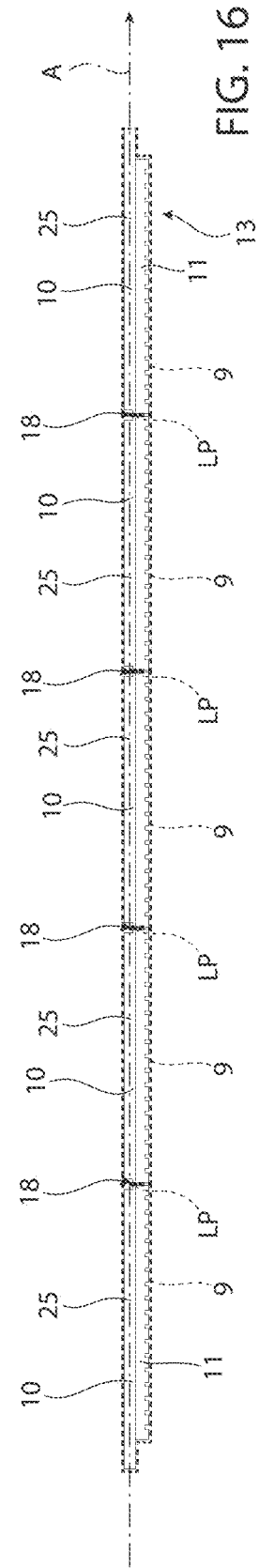

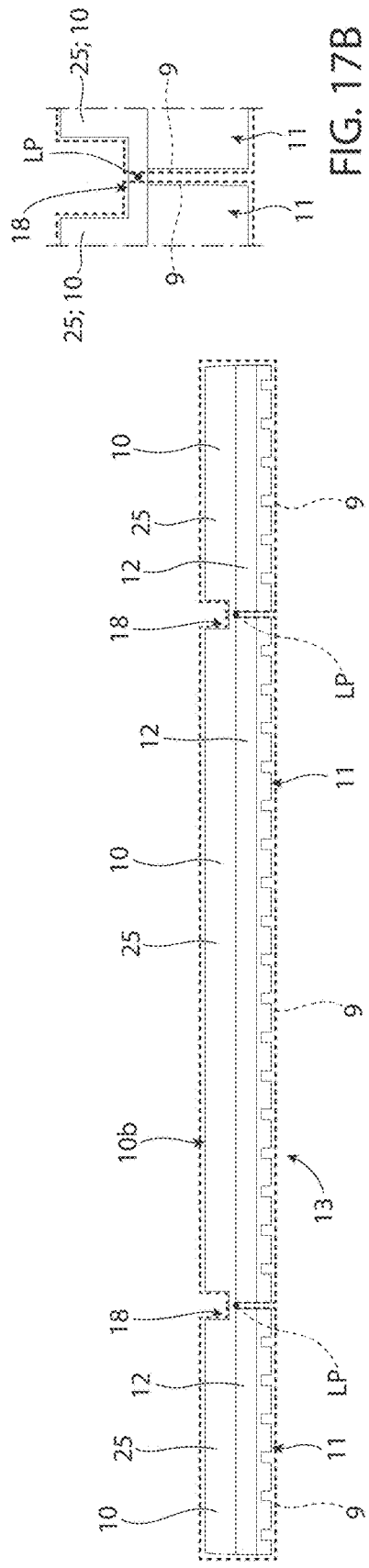
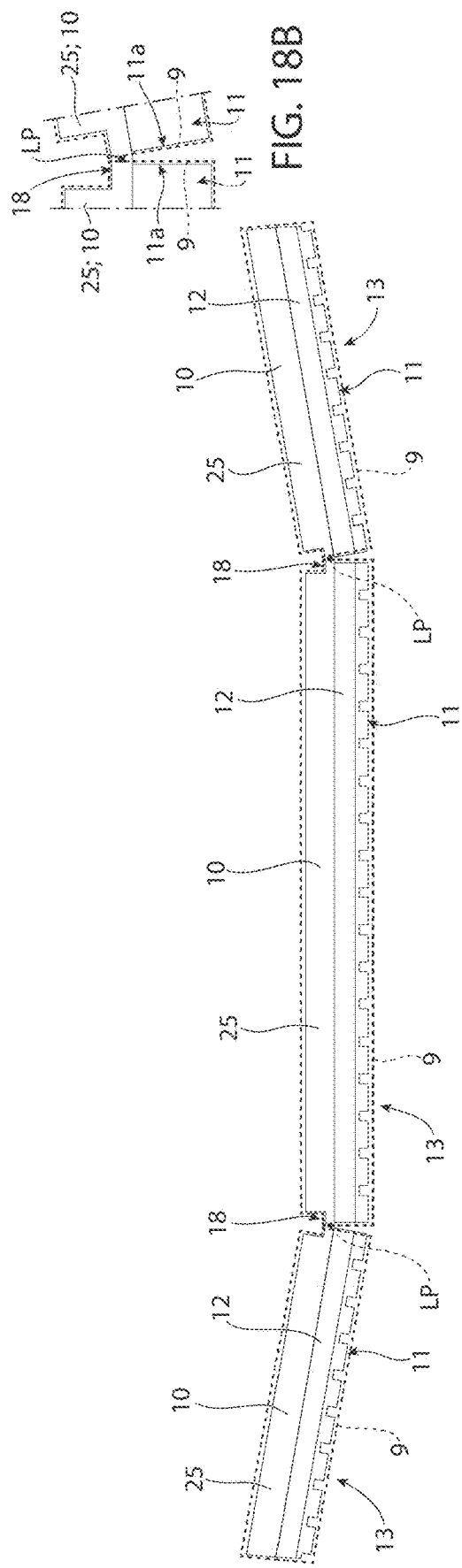

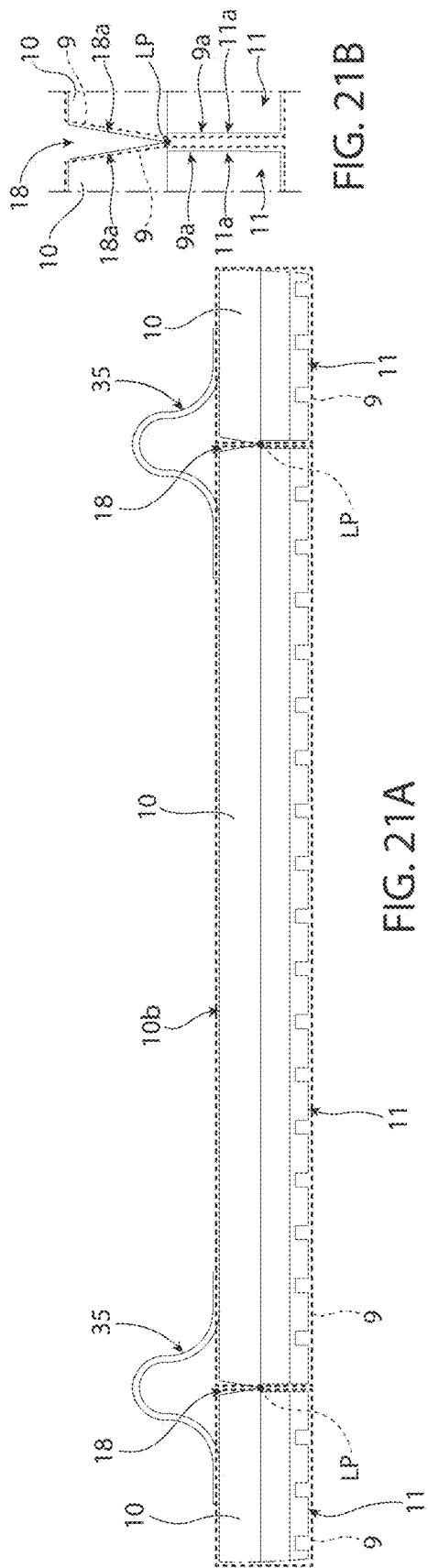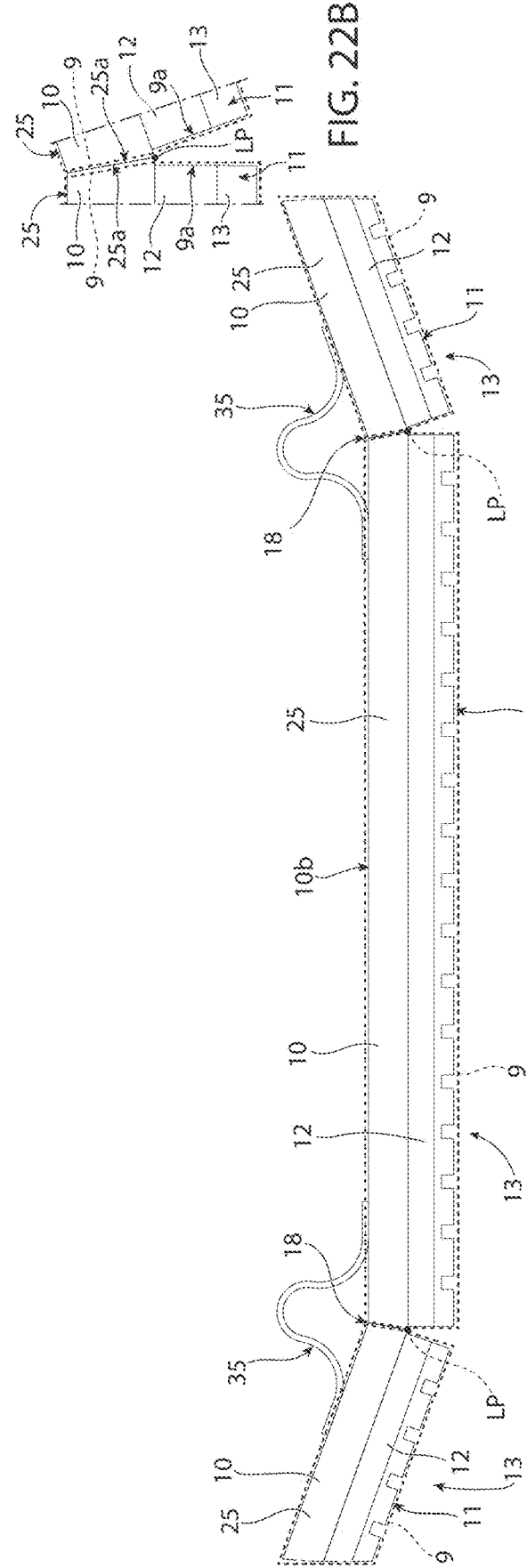

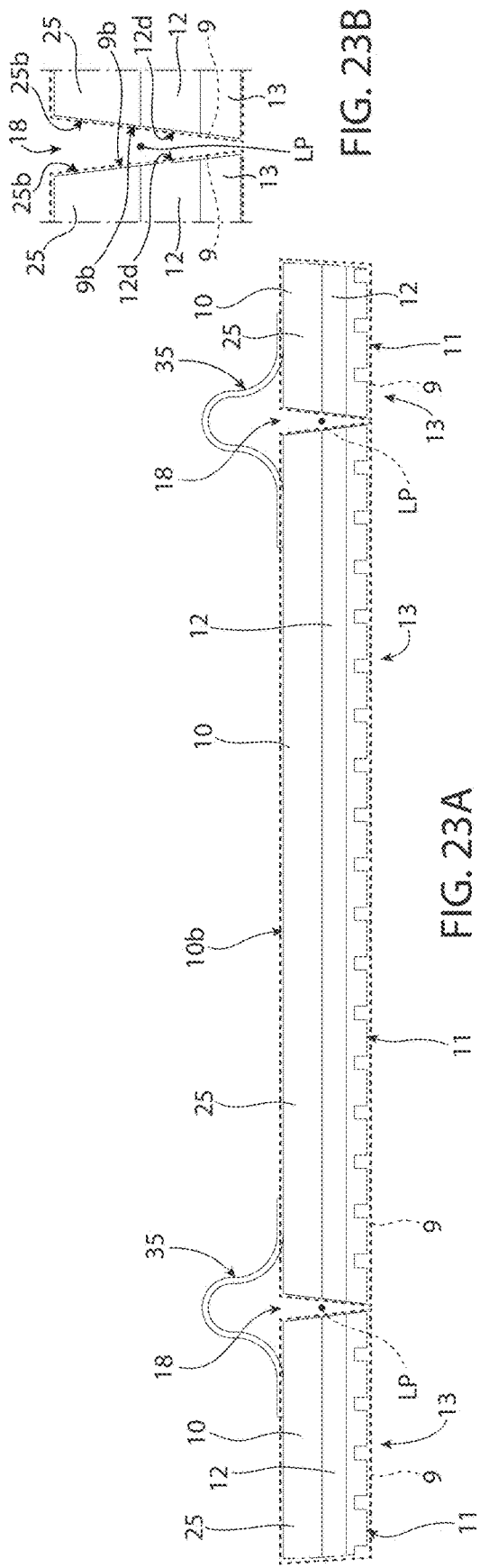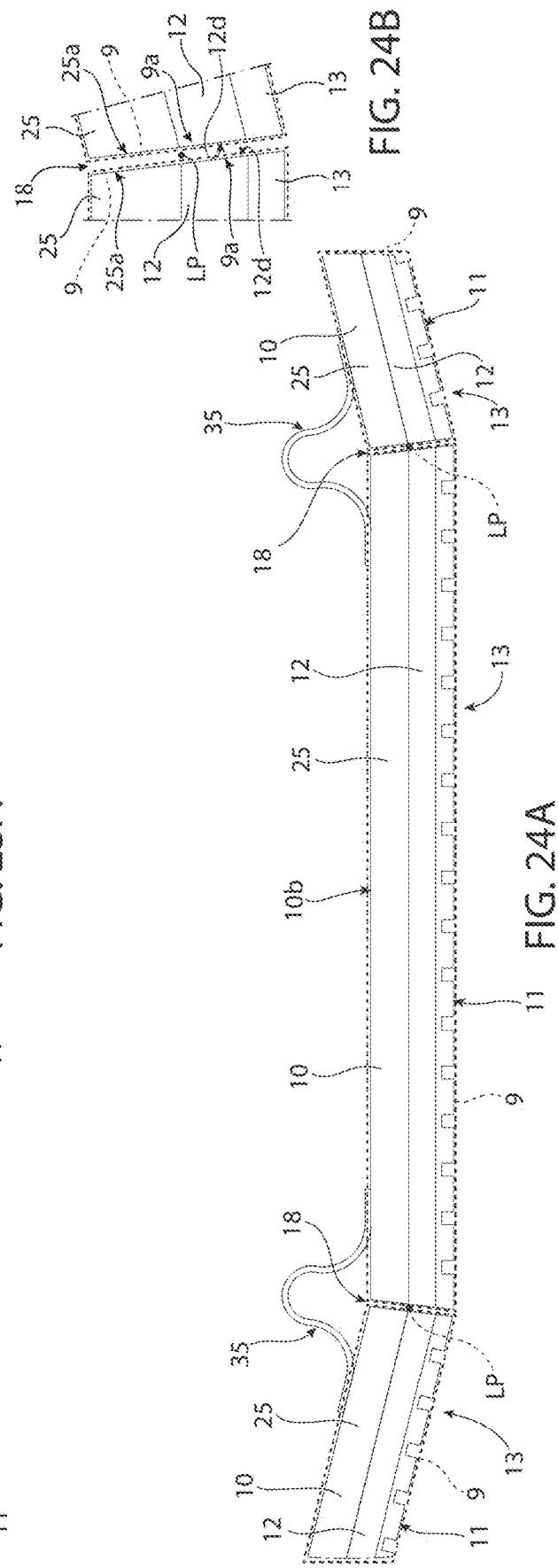

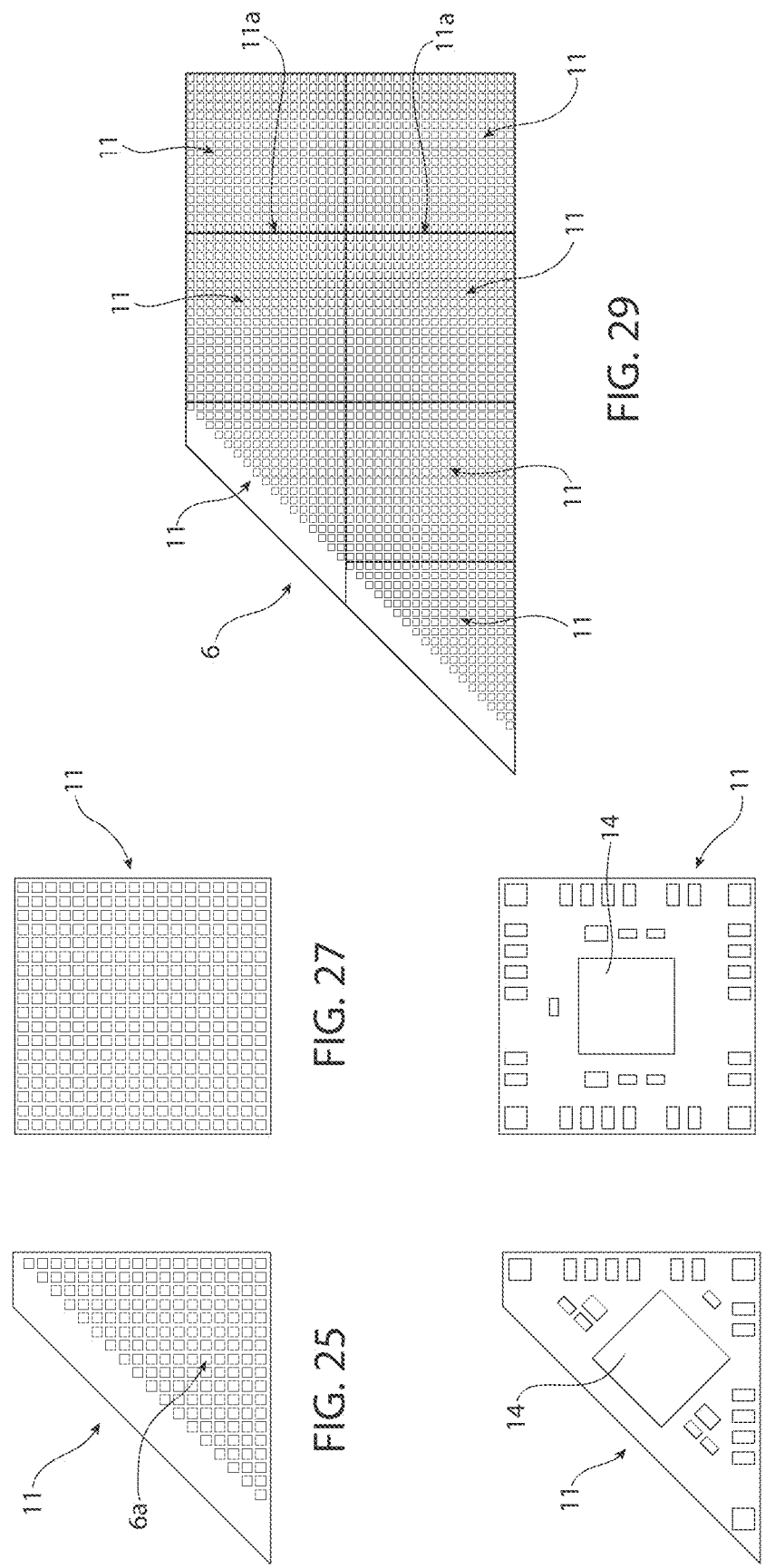

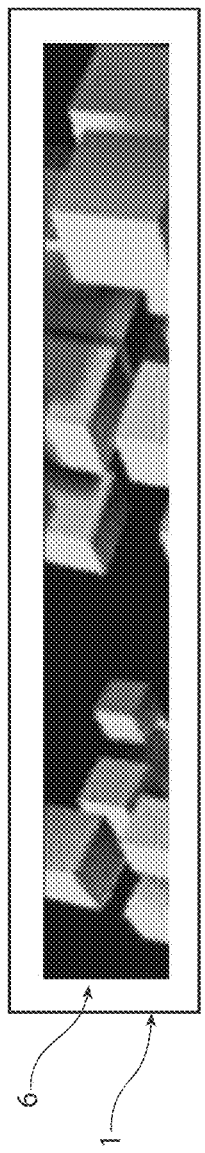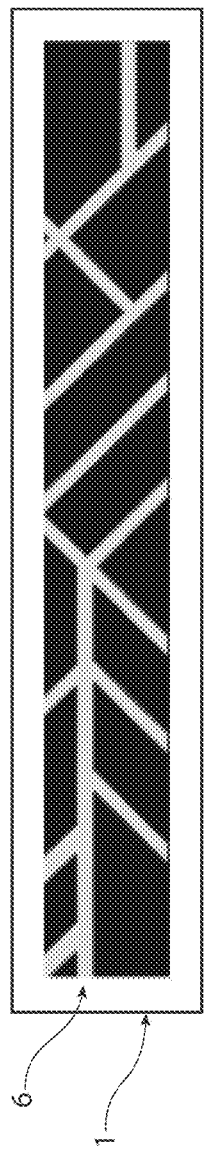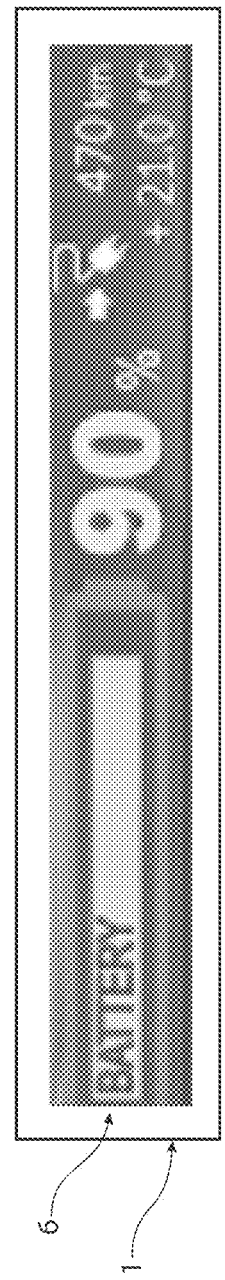

AUTOMOTIVE LIGHTING APPLIANCE AND RELATIVE MANUFACTURING METHOD

CROSS-REFERENCE TO RELATED APPLICATIONS

This patent application claims priority from European patent application no. 22169562.0 filed on Apr. 22, 2022, the entire disclosure of which is incorporated herein by reference.

TECHNICAL FIELD

The present invention concerns an automotive lighting appliance and the relative manufacturing method.

More specifically, the present invention relates to a front automotive lighting appliance, and/or a rear automotive lighting appliance, and/or a side automotive lighting appliance, for automotive vehicles or motor vehicles or similar motor vehicles, of the type preferably comprising: a hull structured to be able to be embedded inside a compartment obtained on the body of the vehicle, at least one front lenticular body at least partially made of transparent or semi-transparent material which can be coupled to the hull at the mouth thereof, and at least one LED display device made according to what described in detail in the following.

BACKGROUND

In the latest generation automotive lighting appliances, the wide diffusion of the electronic technology which provides for the use of LED lighting devices is known.

Such diffusion is essentially due to the fact that the LED light sources allow obtaining numerous and different light effects both static and dynamic, and are particularly versatile and adaptable since they allow carrying out any lighting function provided in a vehicle.

In the aforementioned automotive lighting appliances with LED light sources, it is further required to be able to have emitting surfaces with complex three-dimensional profiles that are capable of emitting light with a certain luminous intensity on areas of large dimensions. Furthermore, said luminous surfaces are required a remarkable degree of personalization of the aesthetic shapes of the signalling functions and the possibility of displaying information messages such as texts or pictograms.

Some solutions currently adopted for meeting the aforementioned requirements provide for the use of OLED (Organic Light Emitting Diode) light sources.

However, such solutions besides not fully meeting the above-indicated conditions, have particularly high manufacturing costs which affect in a non-negligible manner the overall cost of the lighting appliance.

SUMMARY

The object of the present invention is thus to provide an automotive lighting appliance and a method for manufacturing an automotive lighting appliance which are capable of meeting at least the aforementioned requirements.

The object of the present invention is thus to manufacture an automotive lighting appliance that overcomes the above-described technical problems.

According to the present invention, a method for manufacturing the automotive lighting appliance is further provided, according to what claimed in the relative appended claims.

According to the present invention, a method for the operation of an automotive lighting appliance is further provided, according to what claimed in the relative appended claims.

The claims describe preferred embodiments of the present invention and form integral part of the present description.

BRIEF DESCRIPTION OF THE DRAWINGS

The present invention will now be described with reference to the accompanying drawings, which illustrate a non-limiting example embodiment thereof, wherein:

FIG. 6 is a top view, on an enlarged scale, of a mini-LED lighting device mounted in the automotive lighting appliance manufactured according to the principles of the present invention, FIG. 7 is a bottom view, on an enlarged scale, of a mini-LED lighting device mounted in the automotive lighting appliance manufactured according to the principles of the present invention, FIG. 8 is a plan view of a support circuit board of the mini-LED lighting device shown in FIG. 6, FIG. 9 is a top view, on an enlarged scale, of a mini-LED electronic module of the mini-LED lighting device shown in FIG. 6, FIG. 10 is a bottom view, on an enlarged scale, of the mini-LED electronic module shown in FIG. 9, FIG. 11 is a side elevation view, on an enlarged scale, of the mini-LED electronic module shown in FIG. 9.

FIG. 15 is a top view of the mini-LED lighting device manufactured according to an embodiment, FIG. 16 is a cross-section along line XVI-XVI of the mini-LED lighting device shown in FIG. 15, FIGS. 17A and 17B are the cross-section of the mini-LED lighting device shown in FIG. 16 arranged on a plane, and respectively a portion, on an enlarged scale, of the cross-section, FIGS. 18A and 18B are the cross-section of the mini-LED lighting device shown in FIG. 16 in a condition wherein the adjacent emitting mini-LED displays are tilted with respect to each other, and respectively a portion, on an enlarged scale, of the cross-section, FIGS. 22A and 22B are the cross-section of the mini-LED lighting device shown in FIG. 19, wherein the emitting mini-LED displays are tilted with respect to each other, and respectively a portion, on an enlarged scale, of the cross-section, FIGS. 23A and 23B are the cross-section of a mini-LED lighting device manufactured according to a fourth embodiment, and respectively a portion, on an enlarged scale, of the cross-section, FIGS. 24A and 24B are the cross-section, on an enlarged scale, of a mini-LED lighting device of FIGS. 23A and 23B, wherein the emitting mini-LED displays are tilted with respect to each other, and respectively a portion, on an enlarged scale, of the cross-section, FIGS. 25 and 26 show a top view and a bottom view of a mini-LED electronic module with a trapezoidal shape used in the mini-LED lighting device of the automotive lighting appliance manufactured according to the present invention, FIGS. 27 and 28 show a top view and a bottom view of a mini-LED electronic module with a square shape used in the mini-LED lighting device mounted in the automotive lighting appliance manufactured according to the present invention, FIG. 29 shows a top view of a portion of a possible configuration of a mini-LED lighting device having an overall trapezoidal shape, FIGS. 32 to 34 show some examples of light communication functions carried out by the automotive lighting appliance manufactured according to the present invention.

DETAILED DESCRIPTION

The present invention will now be described in detail with reference to the accompanying figures so as to enable a person skilled in the art to manufacture it and use it.

Various modifications to the described embodiments will be immediately apparent to the persons skilled in the art and the general principles described can be applied to other embodiments and applications without thereby departing from the scope of protection of the present innovation, as defined in the appended claims.

Therefore, the present innovation must not be considered limited to the described and illustrated embodiments, but it must be granted the widest scope of protection consistent with the principles and the characteristics described and claimed herein.

Figure 1:
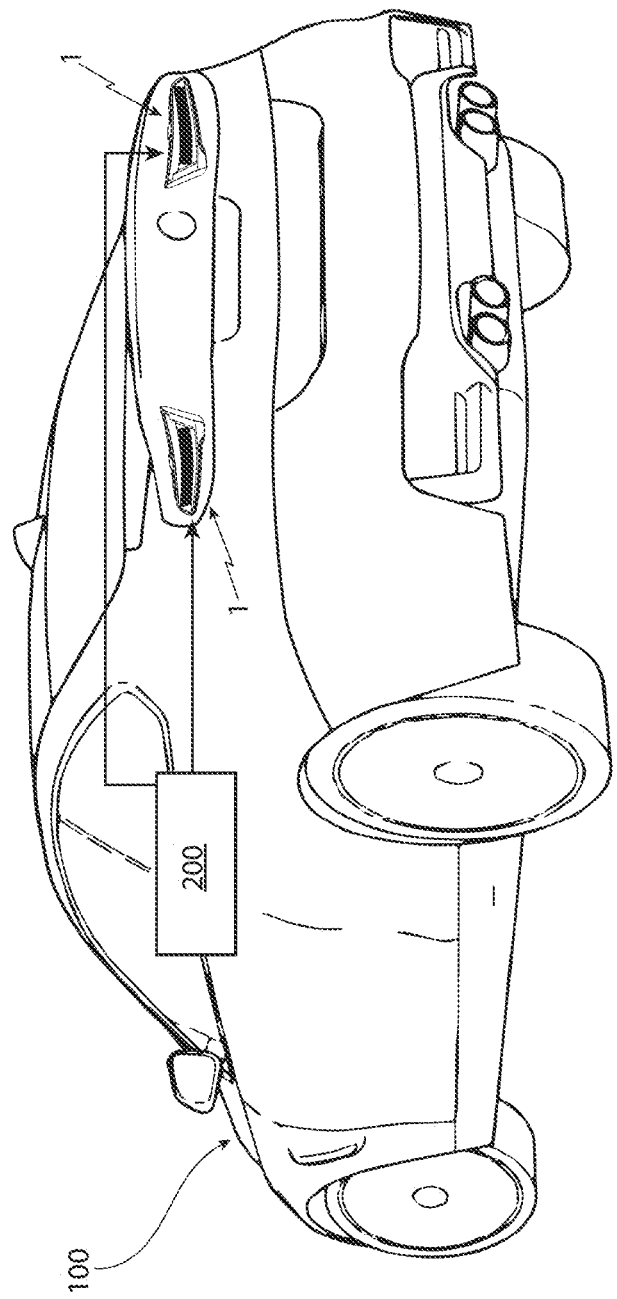
FIG. 1 shows an exemplifying embodiment of an automotive vehicle provided with lighting appliances manufactured according to the principles of the present invention.

With reference to FIG. 1, reference numeral 1 schematically illustrates, as a whole, an automotive lighting appliance (also indicated by headlight or by optical assembly for motor vehicles), which is arranged on a side of a vehicle 100. The vehicle 100 can be, for example, an automobile, a truck, a motor coach, or any similar motor vehicle. The vehicle 100 is provided with an electronic control unit 200 electrically connected to the automotive lighting appliance 1 for controlling it so as to make it carry out motor vehicle light functions.

The automotive lighting appliance 1 is structured to be able to be (firmly) coupled to, and/or incorporated in the vehicle 100, at the front, and/or on the side, and/or at the back. In the embodiment shown in FIG. 1, the automotive lighting appliance 1 corresponds to a rear automotive lighting appliance of the vehicle 100.

It is anyway understood that the present invention is not limited to a rear automotive lighting appliance, but it can be applied in a totally similar manner to any automotive lighting appliance, such as for example a front and/or side lighting appliance of the motor vehicle.

The automotive lighting appliance 1 is configured to carry out one or more pre-established motor vehicle light functions. The pre-established motor vehicle light functions can comprise light communication functions for providing information by means of the representation of luminous images/signs of various type, and light signalling and/or lighting functions, i.e. (traditional) light photometric functions.

As is shown in FIGS. 32-34, when the automotive lighting appliance 1 carries out a light photometric function (such as, for example, position light, stop light or direction indicator light), it displays or generates images. The images can comprise, for example, predefined shapes, pictograms and/or symbols (FIGS. 32-34). The images generated by the automotive lighting appliance 1 can be static (fixed) and/or dynamic (animated images and/or images in movement along the emitting surface of the lighting appliance).

The light photometric functions can comprise lighting functions (light emission) for lighting the area surrounding the vehicle 100 (dipped beams, main beams, fog lights) so as to make, for example, the roadway visible to the driver. Additionally or alternatively, the light photometric functions can comprise signalling functions for signalling the presence of the vehicle 100. Additionally or alternatively, the light photometric functions can comprise functions for signalling the position of the vehicle 100. Additionally or alternatively, the light photometric functions can comprise signalling functions for signalling: a shifting direction of the vehicle 100 (direction indicator), and/or a braking (stop) condition, and/or a reverse gear condition, and/or an alarm/emergency condition, and/or a vehicle lock/unlock condition and/or similar motor vehicle conditions.

Additionally or alternatively, when the automotive lighting appliance 1 carries out a light communication function, it can display or generate text messages, pictograms and/or symbols. The messages can be static (fixed) messages and/or dynamic (animated and/or in movement along the emitting surface of the lighting device) messages.

In other words, in the following description the term automotive lighting appliance 1 is to be understood, by choice, as at least: a front lighting appliance, a rear lighting appliance, a side lighting appliance, an outer position light, a direction indicator (slangily indicated as turn signal), a brake light (slangily indicated as stop light), a fog light, a reverse gear light, a dipped beam light, a main beam light, a lighting appliance arranged on the front grille, or any other type of lighting appliance that can be installed on the vehicle 100.

With reference to an exemplifying embodiment shown in FIGS. 2-5, the automotive lighting appliance 1 can comprise a hull 2, for example a rear hull. In the illustrated example, the hull 2 is preferably, but not necessarily, cup-shaped so as to have an internal cavity. The rear hull 2 can be structured, for example, so as to preferably, but not necessarily, be embedded, for example, inside a compartment (not illustrated) obtained in/on the body of the vehicle 100 (FIG. 1).

Figure 2:
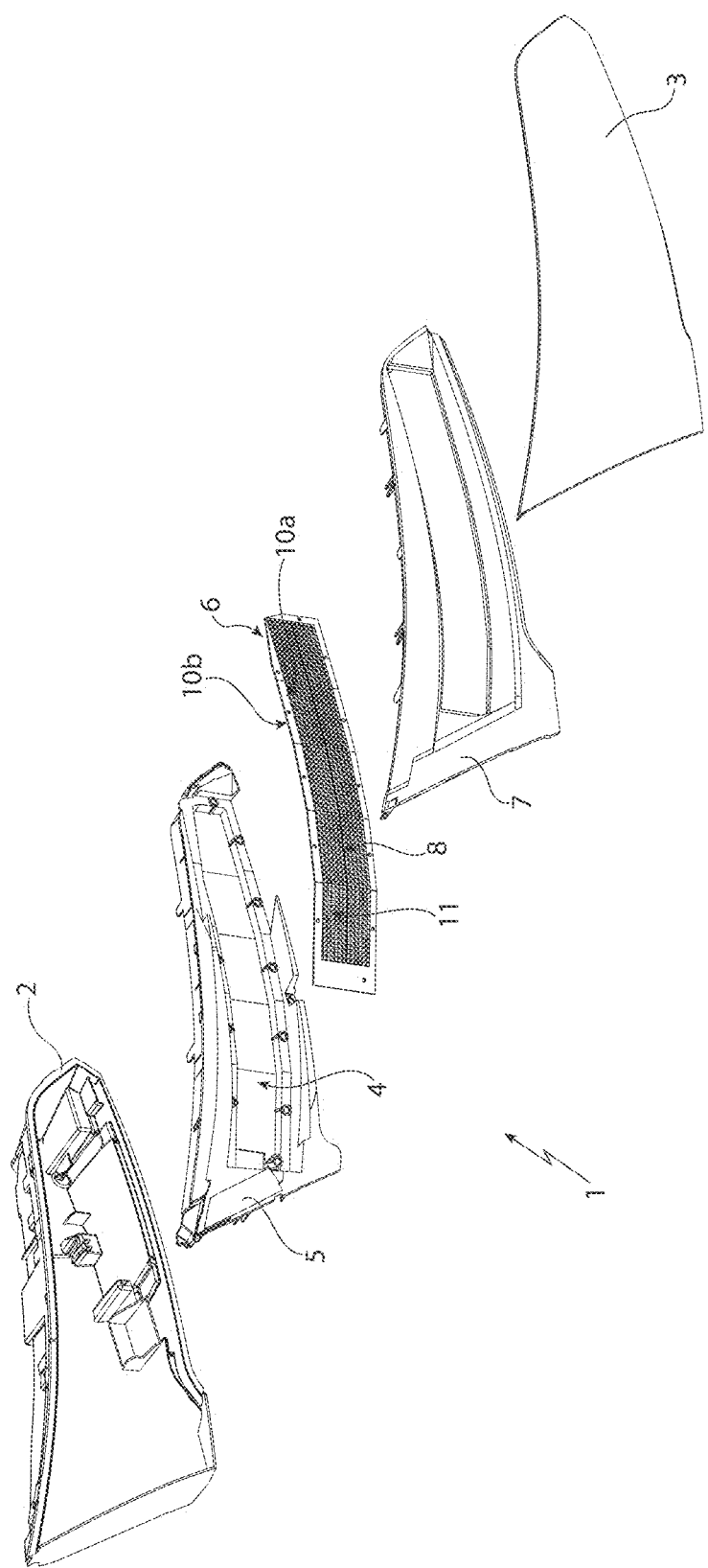
FIG. 2 is an exploded view of an automotive lighting appliance manufactured according to the principles of the present invention.

As is shown in FIG. 2, the automotive lighting appliance 1 can further preferably comprise at least one lenticular body 3, for example a front lenticular body. The lenticular body 3 can be made, for example, at least partially of transparent or semi-transparent material. The lenticular body 3 can be structured to be able to be coupled to the hull 2, for example, at the mouth of the hull 2 so as to close the same.

Figure 3:
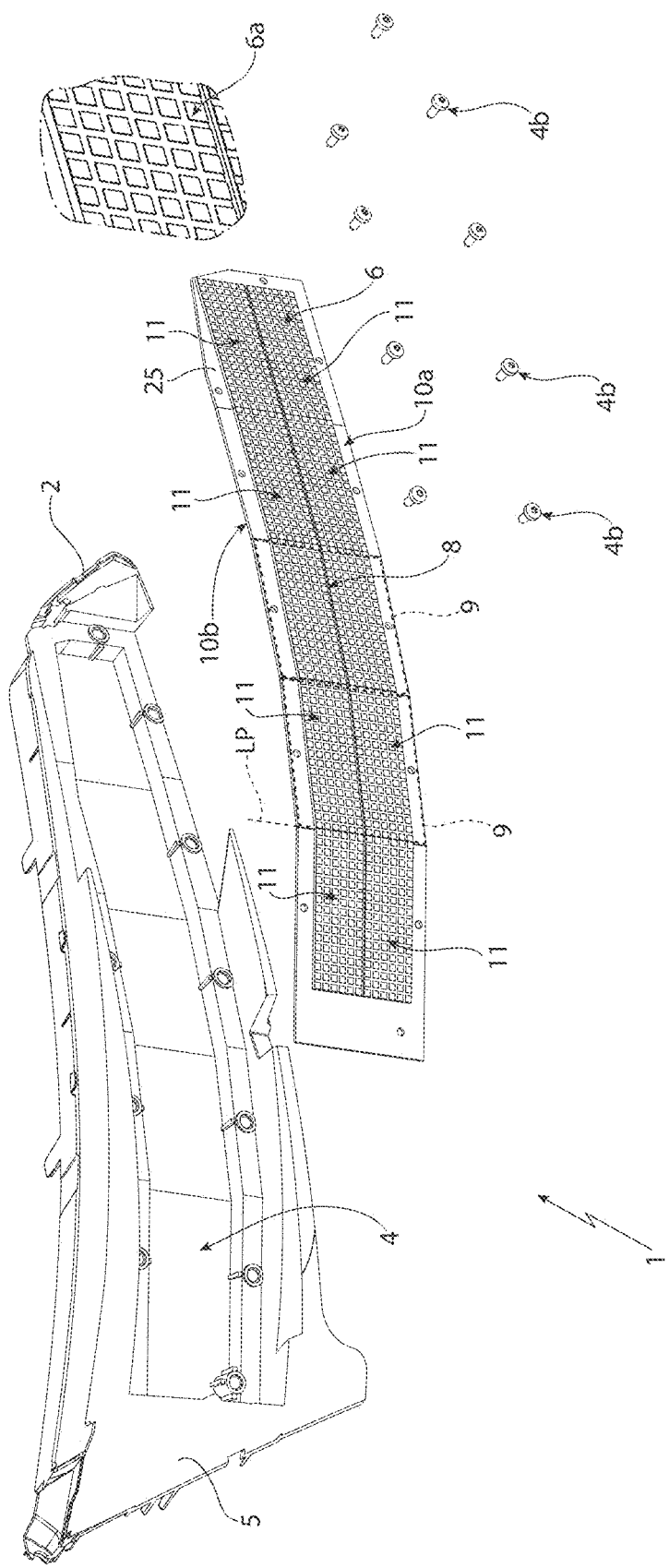
FIG. 3 is an exploded view, with parts removed for clarity, of an automotive lighting appliance manufactured according to the principles of the present invention.

As is shown in FIGS. 2 and 3, the automotive lighting appliance 1 can further comprise an internal wall 4.

According to a possible embodiment, the internal wall 4 can be conveniently shaped so as to have a pre-established three-dimensional shape. According to a convenient embodiment shown in FIGS. 1 to 5, the three-dimensional shape can comprise at least one curved surface (for example partially concave or convex), a curved section.

It is understood that the present invention is not limited to a three-dimensional shape corresponding, for example, to a curved surface or curved section, but it can provide for other three-dimensional shapes, such as for example polyhedral shapes. It is further understood that the three-dimensional shape of the wall 4 can have a so-called mixed or irregular geometry, i.e. can be formed by a geometric combination of one or more curved surfaces and/or one or more polyhedral surfaces.

Figure 4:
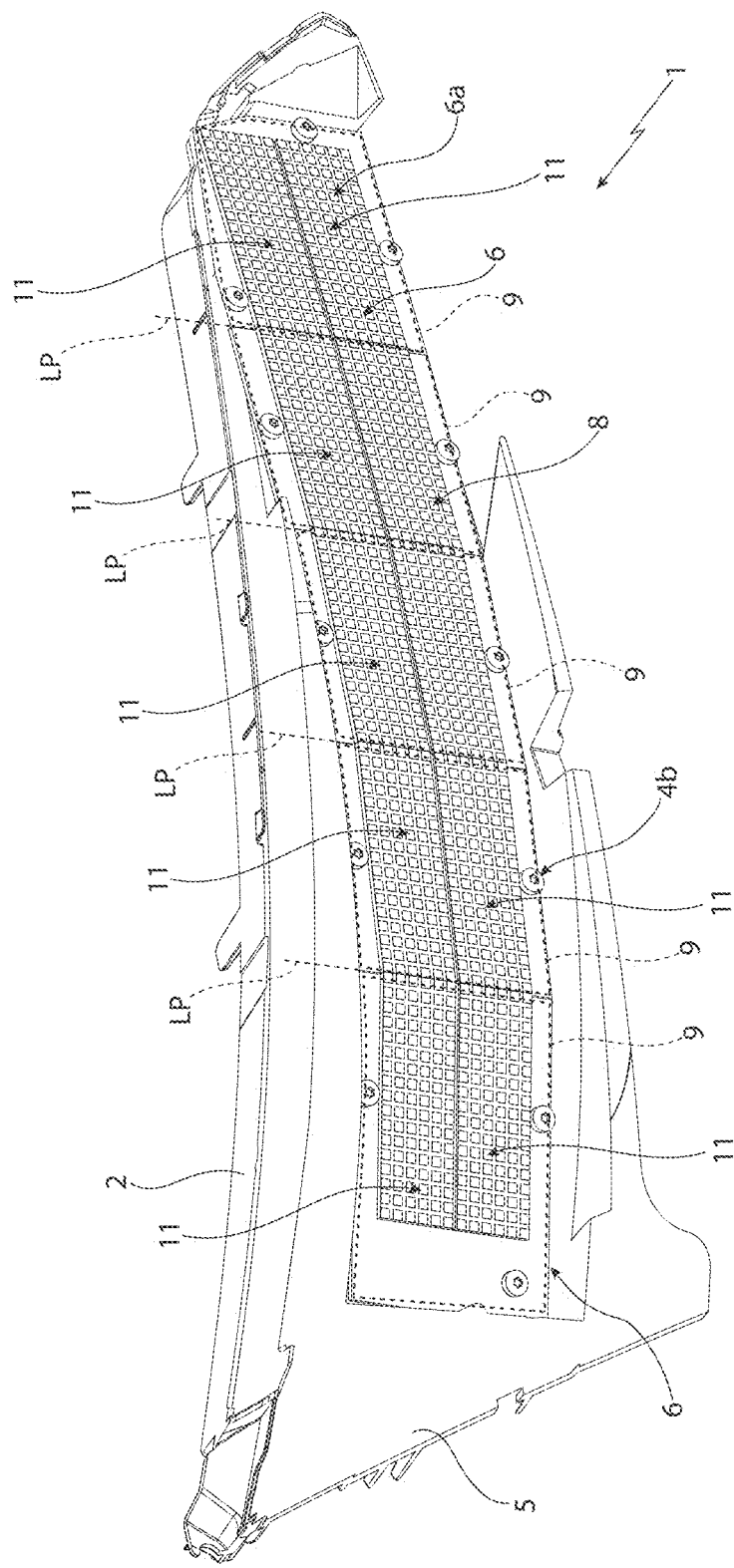
FIGS. 4 and 5 are as many perspective views, with parts removed for clarity, of an automotive lighting appliance manufactured according to the principles of the present invention.

According to an exemplifying embodiment shown in FIGS. 2-4, the automotive lighting appliance 1 can comprise a support frame 5 housed in the hull 2. In the example illustrated in FIGS. 2-4, the support frame 5 has an approximately three-dimensional plate-shaped shape. According to such embodiment, the internal wall 4 is composed of a three-dimensional surface or wall of the support frame 5.

It is understood that according to an alternative embodiment variation (not illustrated), for example in the absence of the support frame 5, the three-dimensional internal wall 4 can be made/obtained directly on/in the hull 2, i.e. can be composed of a surface or face or internal wall of the hull 2. The internal wall 4 can be conveniently oriented towards the mouth of the hull 2 so as to face, for example, the lenticular body 3.

According to the present invention, the automotive lighting appliance 1 comprises a mini-LED lighting device 6.

As is shown in the embodiment shown in FIG. 3, the mini-LED lighting device 6 can be coupled to the internal wall 4 by means of the fixing devices 4b. The fixing devices 4b can comprise screws 4b and/or any similar equivalent device. For example, according to an embodiment not illustrated, the fixing devices 4b can comprise spacer elements or similar members provided, for example, with adjustment screws of the position/distance of the fixing point of the mini-LED lighting device 6 with respect to (from) the wall 4.

With reference to FIG. 6, the mini-LED lighting device 6 has a first face on which mini-LEDs 6a are present. The mini-LEDs 6a are arranged on the first face so as to form a light emitting surface 8 of the automotive lighting appliance 1 adapted to emit light.

With reference to FIGS. 2, 3, and 4, the light emitting surface 8 of the mini-LED lighting device 6 formed by (composed of) the mini-LEDs 6a is conveniently homogeneous and continues in the entire area occupied by the mini-LEDs 6a. In other words, the mini-LEDs 6a have a constant pitch in the entire area.

With reference to FIGS. 6 and 7, the mini-LED lighting device 6 further has a second face, opposite the first face, which is arranged at least partially resting on the internal wall 4 or on a portion thereof.

Figure 5:
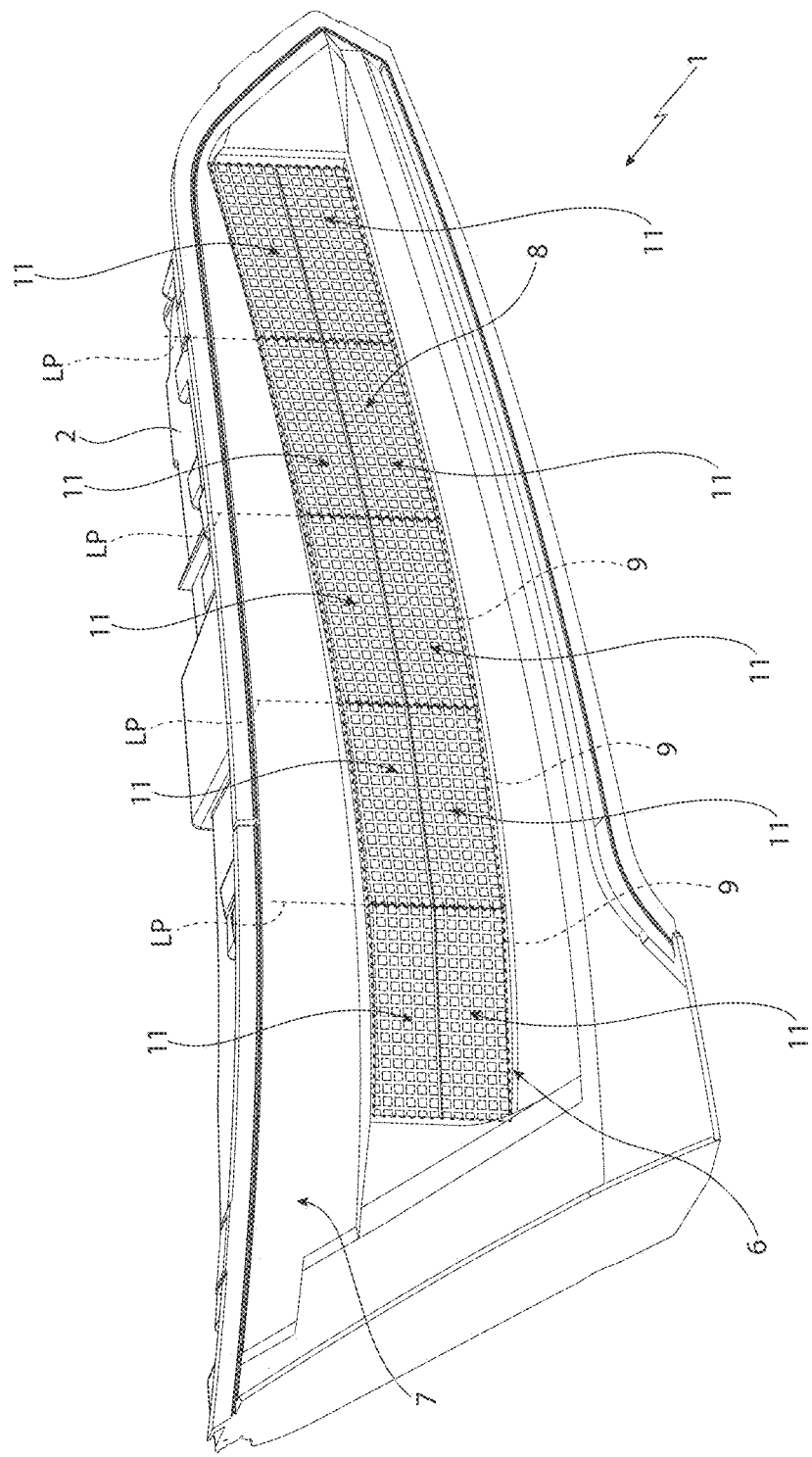

According to a possible embodiment shown in FIGS. 2 and 5, the automotive lighting appliance 1 can further preferably, but not necessarily, comprise a mask frame 7. The mask frame 7 can be plate-shaped and have a three-dimensional shape, and is shaped so as to couple with the support frame 5 and/or with the hull 2, so as to be at least partially arranged above the first face of the mini-LED lighting device 6.

According to a possible embodiment shown in FIGS. 2 and 5, the mask frame 7 comprises a rectangular bezel, which extends at least partially above the outer peripheral portion of the first face of the mini-LED lighting device 6 (devoid of mini-LEDs 6a) so as to trap it and maintain it in abutment against the underlying support frame 5. The mask frame 7 can be conveniently shaped so as to centrally have an opening shaped for leaving uncovered the emitting surface 8 of the mini-LED lighting device 6, i.e. the surface occupied by the mini-LEDs 6a.

According to the present invention, the mini-LED lighting device 6 does not comprise (is without) a liquid crystal panel facing the mini-LEDs 6a. In other words, in use, the light emitted by the mini-LEDs 6a of the mini-LED lighting device 6 passes directly through the lenticular body 3 without the interposition of a liquid crystal panel.

With reference to an embodiment shown in FIGS. 6-11, the mini-LED lighting device 6 conveniently has a modular architecture (i.e. is composed of modules). The mini-LED lighting device 6 comprises: at least one support circuit board 10 and a plurality of mini-LED electronic modules 11.

As is shown in FIGS. 6-8, 12 and, 15, the support circuit board 10 comprises a single support portion 25. The support circuit board 10 has a plate-shaped polygonal shape, for example approximately rectangular, and is made of rigid material (not easily flexible). The support circuit board 10 has a face 10a (shown in FIGS. 6 and 8), a face 10b (FIG. 7) opposite the face 10a, and outer (peripheral) lateral sides or edges 10c.

With reference to FIGS. 9-11, the mini-LED electronic modules 11 have a flat plate-shaped shape and are coupled to the support portion 25 of the support circuit board 10 in adjacent positions, next to each other.

The mini-LED electronic modules 11 conveniently have a polygonal shape and are firmly fixed to the face 10a of the support circuit board 10 so as to have its outer sides 11a in contact against one or more outer sides 11a of the adjacent mini-LED electronic modules 11.

In the accompanying figures and in the following disclosure, with the objective to increase the expository clarity of the present invention, without thereby losing generality, explicit reference will be made to a simplified embodiment of the mini-LED lighting device 6, which comprises two side by side rows or lines of mini-LED electronic modules 11 (horizontal lines in FIGS. 4, 5, 6, 12 and 15), in which the lines extend parallel to an axis A and each comprise five mini-LED electronic modules 11 each aligned with a relative mini-LED electronic module 11 of the other line (in all, ten mini-LED electronic modules 11).

In the examples illustrated in FIGS. 1-24B, the mini-LED electronic modules 11 have the same rectangular shape and the same dimensions and are arranged on the face 10a of the support circuit board 10, next to each other, with the sides 11a in contact with each other.

In the example shown in FIGS. 9, 10 and 11, each mini-LED electronic module 11 comprises a circuit base 12, a mini-LED array 13 and a LED-driver 14.

The circuit base 12 comprises a pressed electronic board which has a flat plate-shaped shape corresponding to that of the mini-LED electronic module 11. The circuit base 12 can be made of rigid material, i.e. a material not (easily) flexible/bendable. The rigid material can comprise, for example, vetronite or glass fibre or the like), has a given thickness, and has electric tracks (not illustrated).

The circuit base 12 has a surface 12a (first surface), a surface 12b (second surface), opposite the surface 12a, and a series of outer peripheral sides 12c.

The mini-LED array 13 is firmly coupled to the surface 12a of the circuit base 12. The mini-LED array 13 comprises (is formed by) a plurality of mini-LEDs 6a electrically connected to the electric tracks of the circuit base 12. The mini-LEDs 6a are arranged so as to cover the entire surface 12a. The mini-LEDs 6a of the mini-LED array 13 can be conveniently arranged on the surface 12a so as to form lines and columns. In the illustrated example, the mini-LED array 13 is composed of a matrix of mini-LEDs 6a formed by rectilinear lines and columns of mini-LEDs 6a aligned with each other.

Each mini-LED 6a has a pre-established pitch with respect to the immediately adjacent mini-LED 6a. The pitch is the distance between the centre of two adjacent mini-LEDs 6a. A pre-established pitch according to the present invention can be comprised, for example, between approximately 0.3 mm and approximately 2 mm.

As is shown in FIG. 10, the LED-driver 14 is coupled to the surface 12b of the circuit base 12. Preferably, the LED-driver 14 can comprise a microprocessor electronic module. The LED-driver 14 can be conveniently positioned centrally on the surface 12b. The LED-driver 14 can be electrically connected to the mini-LEDs 6a of the mini-LED array 13 by means of the electric tracks of the circuit base 12. The LED-driver 14 is configured to selectively control the mini-LEDs 6a of the respective mini-LED array 13.

According to a convenient embodiment, the mini-LEDs 6a and the LED-driver 14 are SMD (Surface Mounting Device) electronic components and are electrically and mechanically coupled to the surface 12a by means of an SMT (Surface Mount Technology) surface mounting process. The mini-LEDs 6a can have dimensions comprised between approximately 100 micron and approximately 1 mm.

The Applicant found that the architecture of the (SMD) mini-LEDs and SMD LED-drivers for the manufacturing of the mini-LED lighting device 6 object of the present invention is advantageous as it allows manufacturing a wide range of mini-LED lighting devices 6 with different dimensional and/or shape characteristics by using traditional pick and place plants/machines, thus containing the manufacturing costs.

It is anyway understood that the present invention is not limited to the use of (SMD) mini-LEDs 6a but, alternatively, the mini-LEDs 6a can be chip electronic components and can be electrically and mechanically coupled to the surface 12a by means of a Chip On Board mounting process.

Furthermore, the use of the above-described mini-LED electronic modules 11 having an electronic modular architecture that provides for the use of LED-drivers 14 mounted directly on the mini-LED electronic modules 11, allows performing in an effective and precise manner controls in line on each mini-LED electronic module 11 by means of standardised and simplified validation processes since they are configured for a standardised electronic architecture which is the same for the mini-LED electronic modules 11 which are assembled for the manufacturing of the mini-LED lighting device 6.

According to an embodiment shown in FIGS. 6, 12-14, the surface 12b of the circuit base 12 of the mini-LED electronic module 11 is firmly fixed to the face 10a of the support circuit board 10.

Figure 12:
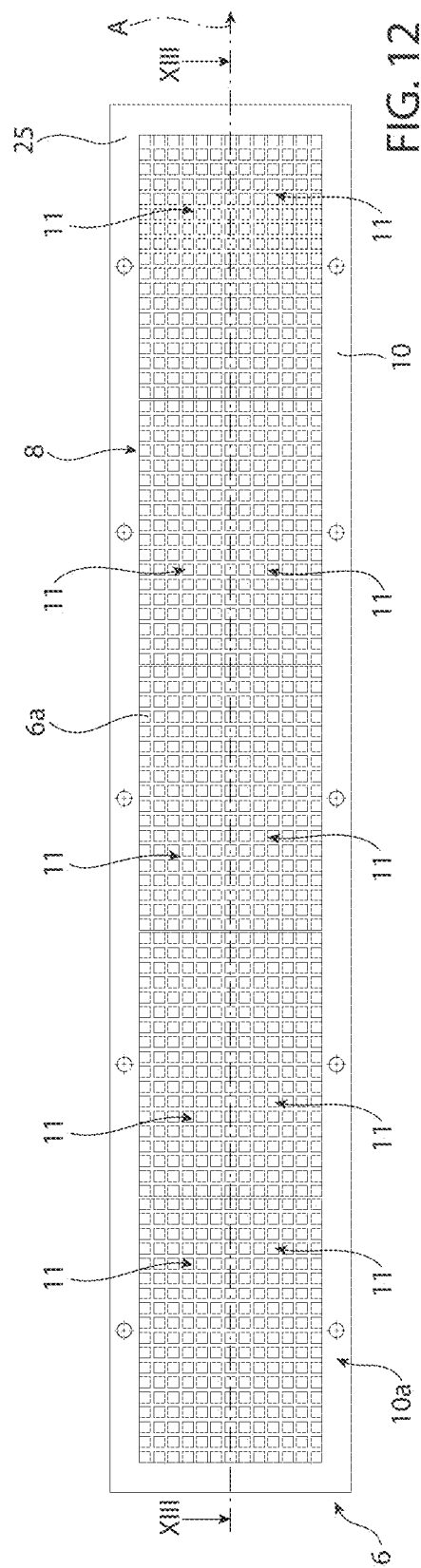
FIG. 12 is a top view of the mini-LED lighting device arranged on a plane manufactured according to an embodiment.
Figure 13:
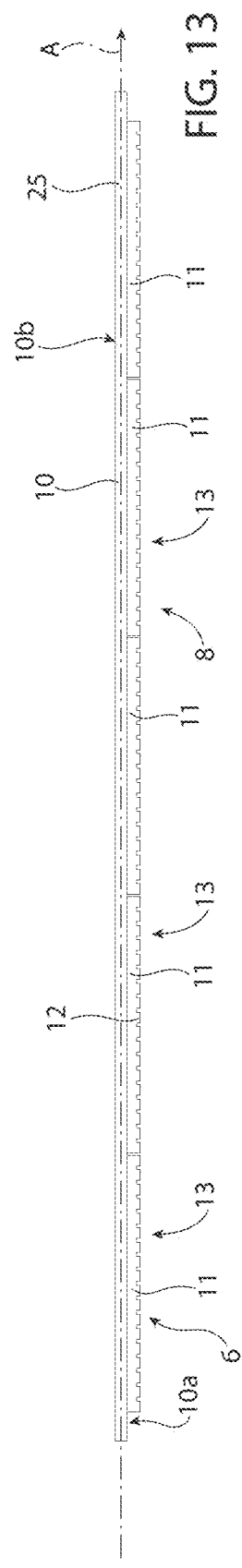
FIG. 13 is a cross-section along line XIII-XIII of the mini-LED lighting device shown in FIG. 12.
Figure 14:
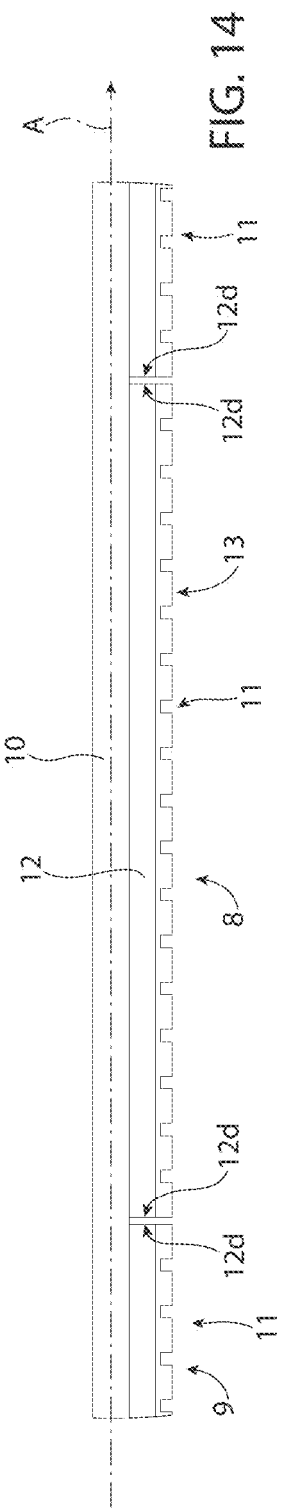
FIG. 14 is the cross-section along line XIII-XIII, on an enlarged scale, of the mini-LED lighting device shown in FIG. 12.
Figure 19:
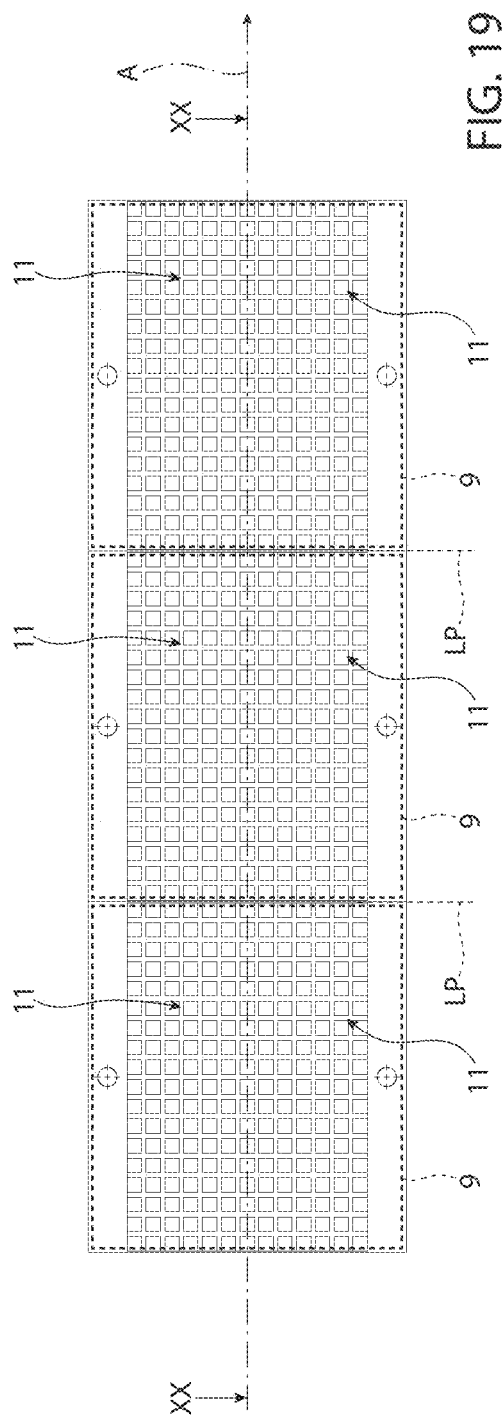
FIG. 19 is a top view of the mini-LED lighting device arranged on a plane manufactured according to a third embodiment.
Figure 20:
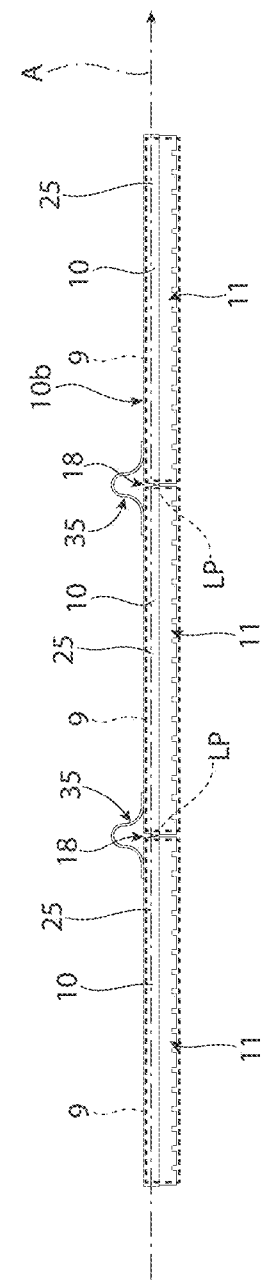
FIG. 20 is a cross-section along line XX-XX of the mini-LED lighting device shown in FIG. 19, FIGS. 21A and 21B are a cross-section of the mini-LED lighting device shown in FIG. 20, and respectively a portion, on an enlarged scale, of the cross-section.

According to an embodiment shown in FIGS. 12-14, the circuit bases 12 of the mini-LED electronic modules 11 are arranged on the face 10a of the support circuit board 10, next to each other so that the mini-LED arrays 13 are also mutually alongside each other so as to form the emitting surface 8.

In the example illustrated in FIGS. 12-14, the circuit bases 12 are arranged on the support circuit board 10 so that the sides 12c are alongside each other, against each other. In the example illustrated in FIGS. 12-14, the support circuit board 10 is formed by a single (enbloc) support portion 25, i.e. is composed of distinct and separate support portions 25. The support circuit board 10, in the example illustrated in FIGS. 12-14, can conveniently have a reduced thickness structured for at least partially bending when the support circuit board 10 is coupled/fixed to the wall 4. The Applicant found this solution advantageous for the walls 8 having a surface with a reduced curvature. In this case, the technical effect obtained is that of manufacturing a continuous emitting surface 8 (homogeneous luminosity) which follows the curved profile of the wall 8 maintaining the pitch constant between the mini-LEDs 6a.

With reference to the embodiments shown in the accompanying FIGS. 15, 16, 17A-24B, the mini-LED electronic modules 11 and the support circuit board 10 are structured so as to form an articulated structure (with respect to the embodiment shown in FIGS. 12-14) composed of a plurality of flat plate-shaped emitting mini-LED displays 9.

According to the embodiment shown in FIGS. 15, 16, 17A-24B, the support circuit board 10 is composed of a plurality of support portions 25 which support a plurality of mini-LED electronic modules 11. The support portion 25 and the relative mini-LED electronic modules 11 form an emitting mini-LED display 9. In the accompanying figures, the emitting mini-LED displays 9 are represented by a broken line.

The flat plate-shaped emitting mini-LED displays 9 have a polygonal shape and are alongside each other. The emitting mini-LED displays 9 are fixed to the internal wall 4 next to each other, so as to lie on respective lying planes which are tilted with respect to each other.

The Applicant found that in this manner the emitting mini-LED displays 9 can be arranged on tilted planes according to a curvature profile of the lighting appliance 1 so as to form an emitting surface 8 having a three-dimensional shape, for example curved.

According to an embodiment shown in FIGS. 15-22B, the emitting mini-LED displays 9 are connected to each other so as to define the articulated structure which allows each emitting mini-LED display 9 to accomplish an at least partial rotational movement with respect to an emitting mini-LED display 9 around a common rectilinear folding line LP so as to lie on a plane which is tilted with respect to the lying plane of the other emitting mini-LED display 9. The emitting mini-LED displays 9 are thus free to rotate, with respect to each other, so as to be arranged on respective tilted lying planes for making the emitting surface 8 assume a pre-established three-dimensional shape, associated with (corresponding to), for example, the three-dimensional shape of the wall 4 on which the emitting mini-LED displays 9 are fixed.

According to an embodiment shown in FIGS. 17A-22B, the folding line LP is approximately coinciding with a side 9a of the emitting mini-LED display 9. Preferably, the side 9a of the emitting mini-LED display 9 is approximately coinciding with the sides 11a of the mini-LED electronic modules 11 which are adjacent to the side 9a.

According to a possible embodiment shown in FIGS. 15-22B, the mini-LED lighting device 6 comprises grooves 18 (obtained, for example, by means of a thickness reduction) which are made on the support board 10 along directions which are parallel and approximately coinciding with the folding lines LP.

According to a convenient embodiment shown in FIGS. 15-22B, each groove 18 is obtained on the face 10b of the support circuit board 10 and delimits with an adjacent groove 18 the support portion 25 of an emitting mini-LED display 9.

Each groove 18 is obtained on the face 10b of the support circuit board 10 between two adjacent emitting mini-LED displays 9.

The technical effect of the groove 18 is to allow the support portions 25 and thus the relative adjacent emitting mini-LED displays 9 of the mini-LED lighting device 6 to accomplish a rotational movement around the folding line LP by some degrees, with respect to each other, so as to be arranged on a lying plane which is tilted with respect to the lying plane of the adjacent emitting mini-LED display 9. In this manner, the mini-LED lighting device 6 has an articulated structured which allows the emitting surface 8 of the mini-LED lighting device 6 to be shaped according to a pre-established three-dimensional shape.

In the exemplifying embodiment shown in FIGS. 17A-22B, on the face 10b of the support circuit board 10 a plurality of rectilinear grooves 18 is obtained which are parallel and spaced from each other and develop along a direction which is orthogonal to the axis A.

In the exemplifying embodiment shown in FIGS. 17A-22B, the grooves 18 extend between the lateral edges 10c opposite the support circuit board 10 and form the support portions 25 of the adjacent emitting mini-LED displays 9 each of which has a rectangular shape and comprises a series of mini-LED electronic modules 11.

In the exemplifying embodiment shown in FIGS. 15-22B, each of the emitting mini-LED displays 9 comprises two mini-LED electronic modules 11 flanked and aligned with each other.

FIGS. 17A and 17B show the mini-LED lighting device 6 in a first geometrical condition in which the support portions 25 of the support circuit board 10 are arranged resting on a plane coplanar to each other.

FIGS. 18A and 18B show the mini-LED lighting device 6 of FIGS. 17A and 17B in a second geometrical condition in which the support portions 25 of the support circuit board 10 are arranged on tilted planes so as to make the mini-LED lighting device 6 and the emitting surface 8 thereof assume a three-dimensional shape (with a slightly curved profile). In the second geometrical condition shown in FIGS. 18A and 18B, the emitting mini-LED displays 9 are slightly rotated with respect to each other around the folding lines LP so as to be arranged on respective planes which are tilted with respect to each other (along the axis A).

In the exemplifying embodiment shown in FIGS. 15-22B, the grooves 18 are obtained on the support circuit board 10 so as to have a depth which is less than the thickness of the support circuit board 10. In this embodiment, the support portions 25 of the emitting mini-LED displays 9 remain connected in pairs by means of a connecting edge of the support circuit board 10 which extends along the folding line LP. The connecting edge has a reduced thickness which is structured for bending so as to allow the rotation of the emitting mini-LED displays 9 around the folding line LP.

According to the embodiment shown in FIGS. 15-18B, the grooves 18 can have an approximately U-shaped section transverse to the folding line LP.

The U-shaped section of the groove 18 can be conveniently obtained by means of a local thickness reduction of the support circuit board 10, in which the reduction is performed by means of asportation of material obtained by operating a miller along a rectilinear direction corresponding to the folding line LP.

It is understood that in the embodiment shown in FIGS. 15-18B, the support circuit board 10 is not divided but remains in a single body since the connecting edges are maintained. This solution is advantageous since, on the one hand, it allows quickly mounting the mini-LED lighting device 6 through a single operation, and on the other hand allows obtaining an emitting surface 8 having any three-dimensional shape.

With reference to the embodiment shown in FIGS. 19-22B, the grooves 18 can have a V-shaped section transverse to their extension direction. Each groove 18 is internally delimited by two flat internal walls 18a facing each other. Preferably, the grooves 18 can be obtained by means of a V-scoring.

The angle between the two walls 18a of a groove 18 can be established on the basis of the bending/folding, i.e. of the maximum rotation to make an emitting mini-LED display 9 accomplish with respect to the adjacent emitting mini-LED display 9. The technical effect of the V-scoring is that to pre-shape tilted edges of the support portions 25 which, when in mutual rest, establish a pre-established mutual inclination between adjacent emitting mini-LED displays 9.

With reference to a different embodiment shown in FIGS. 23A and 24B, the support portions 25 of the emitting mini-LED displays 9 are not maintained connected to each other through the connecting edge of the support circuit board 10 (as provided in the embodiments shown in FIGS. 15-22B).

As is shown in FIGS. 23A-24B, the support circuit board 10 is formed by a plurality of support portions 25 of the emitting mini-LED displays 9 which are distinct and separate from each other.

According to this embodiment, the adjacent emitting mini-LED displays 9 lie on respective planes which are tilted with respect to each other by pre-established angles. The emitting mini-LED displays 9 have on the respective outer sides 9a of mutual contact (rest), flat walls 9b which rest against each other. The flat walls 9b are each tilted with respect to the lying plane of the relative emitting mini-LED display 9 of a relative angle.

With reference to the embodiment shown in FIGS. 23A to 24B, the support portions 25 of the emitting mini-LED displays 9 can be maintained connected by means of the flexible connecting straps 35.

As is shown in FIGS. 24A and 24B, at least one side 9a of an emitting mini-LED display 9 is in contact with a side 9a of an adjacent emitting mini-LED display 9. The side 9a has a distance with respect to the peripheral mini-LEDs 6a adjacent to the side 9a, equal to half of the pre-established pitch.

As is shown in FIGS. 23A to 24B, the outer contact sides 25a of the support portions 25 of the adjacent emitting mini-LED displays 9 have flat lateral walls 25b. The flat lateral wall 25b of the support portion 25 of the side 9a of the emitting mini-LED display 9 is tilted by a pre-established angle with respect to the lying plane of the relative support portion 25. The pre-established angle of the flat lateral wall 25b of the emitting mini-LED display 9 can be conveniently less than 90°. The emitting mini-LED displays 9 that have the relative flat lateral walls 25b in mutual rest with respect to each other can lie on respective planes that are tilted with respect to each other by an angle less than or equal to 90°.

The outer sides 12c of the bases 12 of the mini-LED modules 11 which are arranged on a support portion 25 and are parallel and adjacent to a contact side 9a of an emitting mini-LED display 9, have a flat lateral wall 12d tilted by a pre-established angle α with respect to the lying plane of the relative base 12.

The lateral wall 12d of the circuit base 12 and the lateral wall 25b of the relative support portion 25 together form the lateral flat wall 9b of the contact side 9a of the emitting mini-LED display 9. The lateral wall 12d of the circuit base 12 and the lateral wall 25b of the relative support portion 25 together form the lateral flat wall 9b of the contact side 9a of the emitting mini-LED display 9 and are coplanar with respect to each other. In other words, the lateral side wall 9b of the contact side 9a of the emitting mini-LED display 9 forms a tilted bevel, i.e. forms a tilted flat corner adapted to be arranged resting on the tilted bevel or corner of the adjacent emitting mini-LED display 9.

In the example shown in FIGS. 23A to 24B, the tilted lateral flat wall 9b of an emitting mini-LED display 9 of the mini-LED lighting device 6 is arranged approximately resting against the tilted lateral flat wall 9b of the contact side 9a of the adjacent emitting mini-LED display 9. The emitting mini-LED displays 9 that have the relative flat lateral walls 9b in mutual rest can lie on respective planes that are tilted with respect to each other by an angle which is less than or equal to 90°.

Preferably, the tilted lateral wall 9b of each emitting mini-LED display 9 is parallel to the peripheral row of mini-LEDs 6a adjacent to the side 12c of the base 12 from which the wall 9b develops. Preferably, the distance between the side 12c and the peripheral row of adjacent mini-LEDs 6a is approximately equal to half of the pre-established pitch.

The Applicant found that by shaping the angular inclination of the walls 9b on the basis of the shape to make the mini-LED lighting device 6 assume and by arranging the emitting mini-LED displays 9 next to each other with the walls 9b in abutment against/in contact with each other it is possible to compose a mini-LED lighting device 6 having complex three-dimensional geometries, for example curved or polyhedral in which the emitting surface 8 has a three-dimensional shape and is advantageously continuous. In particular, the tilted walls 9b of the sides 9a of the emitting mini-LED displays 9 when resting against each other maintain the sides 12c of the bases 12 in mutual contact and thus prevent a distancing between the peripheral rows of the adjacent mini-LED modules 11 when the same lie on tilted planes. This has the technical effect of maintaining the pre-established pitch also between the peripheral rows of the mini-LED modules 11 belonging to the adjacent emitting mini-LED displays 9. Thanks to this, it is thus possible to obtain a mini-LED lighting device 6 provided with a large dimensioned emitting surface 8 having a three-dimensional shape, i.e. shaped according to the three-dimensional profile (for example curved) of the internal wall 4, which is capable of emitting a uniform and continuous light on the entire area without losing continuity of the pitch and thus of the image between adjacent mini-LED modules 11 tilted with respect to each other.

It is understood that according to the embodiment shown in FIGS. 23A and 23B, the three-dimensional shape of the emitting surface 8 of the modular lighting device 6 is obtained when the emitting mini-LED displays 9 are coupled to the walls 8. In this case, the three-dimensional shape of the emitting surface 8 adapts to (follows) the three-dimensional shape of the wall 8 on which the emitting mini-LED displays 9 are coupled.

However, it is conveniently possible to shape the three-dimensional shape of the emitting surface 8 so that it is not associated with the shape of the wall 8. For example, with the use of spacer elements and/or connecting devices (screws having variable length) it is possible to adjust the inclinations of the emitting mini-LED displays 9 so as to obtain an emitting surface 8 with a three-dimensional shape independent of (different from) the shape of the wall 8. In other words, the light emitting surface 8 obtained by means of the approach of the emitting mini-LED displays 9 can be shaped according to three-dimensional shapes different from the three-dimensional shape of the wall 4.

With reference to the exemplifying embodiment shown in FIGS. 9, 10 and 11, the mini-LED electronic module 11 and the circuit base 12 thereof have a rectangular shape.

On the surface 12b of the circuit base 12 there is a plurality of pads 20 or electric welding pads made of electrically conductive material.

The pads 20 are adapted to receive (in use) electric control signals and/or electric supply signals and are electrically connected to the LED-driver 14 and/or to the mini-LED array 13.

Conveniently, the pads 20 of the mini-LED electronic module 11 can be arranged in a row next to each other along a side 12c of the base 12 so as to be adjacent to respective pads 20 arranged along a side adjacent to the base 12 of the adjacent mini-LED module 6.

Conveniently, the group of pads 20 which are present on a side 12c and are associated with relative functions can be replicated on more sides, preferably on all four sides, of the circuit base 12. This allows increasing the freedom of mutual wiring/connection of the mini-LED electronic modules 11 so as to obtain a greater degree of modularity.

On the surface 12b of the circuit base 12 of the mini-LED electronic modules 11 there further are mechanical pads adapted to create the firm fixing of the base 12 on corresponding mechanical connection pads 21 of the support board 10, for example during the SMT mounting process.

With reference to FIG. 9, on the face 10a of the support board 10 there is a plurality of pads 22 or electrical welding pads which are positioned so as to be coinciding and thus electrically connectable with the respective pads 20 present on the circuit base 12 of the mini-LED electronic modules 11.

The pads 22 present on the circuit support board 10 and associated with the adjacent mini-LED electronic modules 11 are electrically connected to each other according to a pre-established electric interconnection such as, for example, reflow soldering process.

Conveniently, each pad 22 present on the circuit support board 10 and associated with a mini-LED electronic module 11 is close to a corresponding pad 22 present on the support board 10 and is associated with an adjacent mini-LED electronic module 11.

The support board 10 can be provided with at least one electric connector 23 adapted to receive in use the control and supply signals.

The electric connector 23 can be conveniently arranged on a side of the support board 10 and is electrically connected to the pads 22 so as to create with the same an electric connection circuit.

Figure 30:
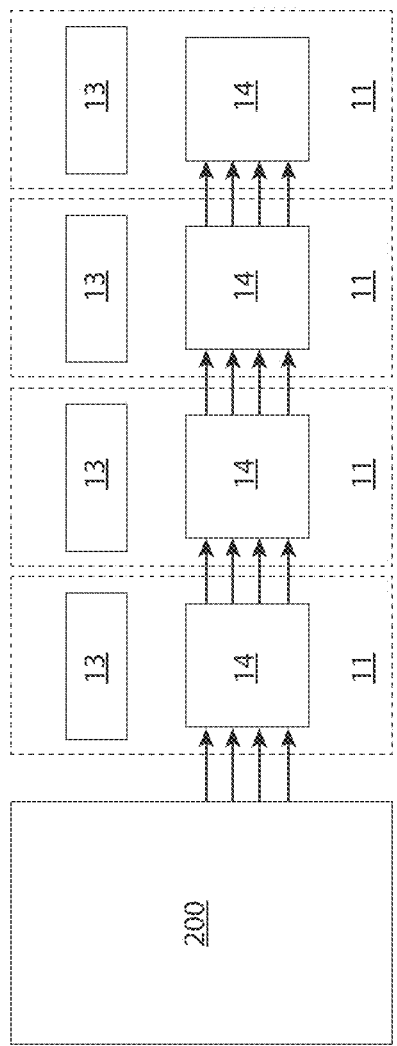
FIGS. 30 and 31 show circuit connection schemes of the drivers in a mini-LED lighting device adapted to be mounted in the automotive lighting appliance manufactured according to the present invention.
Figure 31:
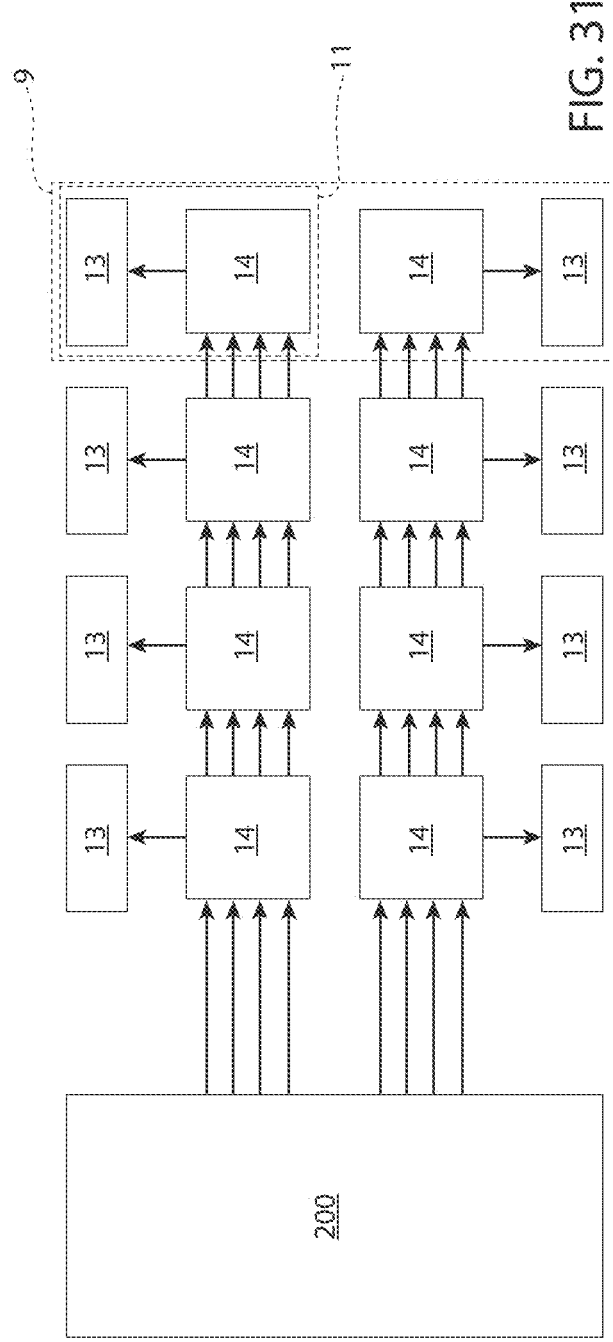

For example, it can be convenient to create an electric connection circuit structured according to what provided in a Daisy Chain circuit architecture. FIG. 30 schematically shows a possible electric connection circuit with Daisy Chain circuit architecture. In FIG. 30, the supply signals are indicated by VCC, GND, the control signals comprise a clock signal CLK, the signals relative to the bright image are indicated by SIN, SOUT.

The technical effect obtained thanks to this electric connection circuit is that to be able to implement a series communication protocol between the LED-drivers 14 which allows having a single communication channel for the datum reducing the number of connections between the LED-drivers. Furthermore, the above-mentioned communication protocol allows reducing the number of messages sent by the control unit 200 of the vehicle 100 for composing the image in the mini-LED lighting device 6 since the message is transmitted in sequence between the LED-drivers.

It is anyway understood that the present invention is not limited to a Daisy Chain electric connection circuit, but, as is shown in FIG. 30, it can also have circuit architectures different from Daisy Chain, for example according to a double-wire I2C series architecture.

With reference to FIGS. 8 and 9, cooling through openings 26 are made on the circuit support board 10. In the illustrated example, the preferably quadrangular (rectangular) cooling through openings 26 are made on the circuit support board 10 so as to house the LED-drivers 14 of the mini-LED electronic modules 11 when the circuit base 12 is fixed to the face 10a of the support circuit board 10. The technical effect obtained by the cooling openings 26 is that to ensure the thermal dissipation of the LED-driver 14.

On the surface 12b of the circuit base 12, inside the through opening 26, additional electronic components 27 can be further arranged electrically connected to the LED-driver 14 and/or to the mini-LED array 11.

It is understood that the present invention is not to be considered limited to the embodiment shown in FIGS. 1 to 24B, but the number, and/or the dimension, and/or the shape, and/or the positioning of the mini-LED electronic modules 11 on the support circuit board 10 are characteristics which can be changed/varied, on the basis of the teaching of the present invention, depending on the dimension, and/or on the shape of the mini-LED lighting device 6 which is intended to be manufactured.

Furthermore, according to the present invention, the polygonal shape of the mini-LED electronic modules 11 is not limited to the rectangular shape but, additionally or alternatively to the shapes described and illustrated above, the mini-LED electronic modules 11 can have other polygonal shapes. As is shown in the exemplifying embodiments shown in FIGS. 25-29, the polygonal shapes of the mini-LED electronic modules 11 of the mini-LED lighting device 6 can be for example, by choice: triangular, trapezoidal (FIGS. 25 and 26), square (FIGS. 27 and 28), pentagonal, hexagonal, octagonal or the like.

It is further understood that, according to the present invention, the mini-LED lighting device 6 can comprise a combination of mini-LED electronic modules 11 all having the same shapes and dimensions. It is further understood that, according to the present invention, the mini-LED lighting device 6 can comprise a combination of mini-LED electronic modules 11 having different shapes and/or different dimensions with respect to each other.

It is further understood that the mini-LED electronic module 11 does not comprise micro-LEDs. It is further understood that the mini-LED electronic module 11 does not comprise micro-LEDs composed of chips/pixels having dimensions less than 100 micron. The mini-LED electronic module 11 does not have a micro-LED electronic architecture.

It is further understood that the dimensions, the depth, the number, the position and the orientation of the grooves 18 on the support board 10 can be established and modified on the basis of the position and orientation of the folding lines LP to be made on the mini-LED lighting device 6. Furthermore, the folding lines LP can be established and modified on the basis of the three-dimensional shape to make the mini-LED lighting device 6 assume.

It is further understood that the present invention is not limited to grooves 18 having a V or U section but other sections can be provided different from the V and U.

According to an embodiment variation shown in FIGS. 12 to 14, the support circuit board 10 is a single body devoid of grooves 18 having a flat shape on which the mini-LED electronic modules 11 are firmly arranged. This embodiment can be suitable to automotive lighting appliances with a (flat) bi-dimensional shape and/or a slightly curved three-dimensional shape.

In the following, a convenient method for manufacturing the automotive lighting appliance 1 will be described, according to what indicated in the above-described teaching.

The method comprises the steps of: providing at least one plate-shaped support board 10, providing a plurality of flat plate-shaped mini-LED electronic modules 11, firmly coupling the flat plate-shaped mini-LED electronic modules 11 on the support board 10, next to each other so as to manufacture the mini-LED lighting device 6, and coupling the support circuit board 10 of the mini-LED lighting device 6 to the internal wall 4.

The method comprises the step of firmly fixing the flat plate-shaped mini-LED electronic modules 11 to the support board 10, next to each other by means of an SMT surface mounting process based on a Surface Mount Technology.

Before firmly coupling the flat plate-shaped mini-LED electronic modules 11 to the support board 10, the cooling through openings 26 have to be made on the support circuit board 10 in positions associated with the housing positions of the LED-drivers 14 of the mini-LED electronic modules 11.

In case the support circuit board 10 has the grooves 18 and/or is composed of a plurality of support portions 25, the coupling step of the support circuit board 10 of the mini-LED lighting device 6 to the internal wall 4, provides for the step of fixing the support portions 25 to the internal wall 4 next to each other, so as to lie on respective lying planes which are tilted with respect to each other by pre-established angles that depend on (vary on the basis of) the three-dimensional shape to make the emitting surface 8 assume.

According to the embodiment shown in FIGS. 23-24 wherein the support circuit board 10 comprises a plurality of support portions 25, the method provides for the step of arranging the tilted flat walls 9b of the outer sides 9a of the adjacent emitting mini-LED displays 9 resting with respect to each other so that the relative emitting mini-LED displays 9 lie on planes tilted with respect to each other by angles that depend on the three-dimensional shape to make the emitting surface 8 assume.

According to the embodiment shown in FIGS. 15-22 wherein the support circuit board 10 comprises the grooves 18 that delimit the support portions 25, the method provides for the step of maintaining the outer sides 9a of the adjacent emitting mini-LED displays 9 connected to each other by means of the connecting edge, and rotating at least partially the emitting mini-LED displays 9 with respect to each other around the folding lines LP so as to arrange them on respective tilted planes.

According to the embodiment shown in FIGS. 15-22 wherein the support circuit board 10 comprises the grooves 18 that delimit the support portions 25, during the prearrangement of the support circuit board 10, i.e. before its coupling to the internal wall 8, the method provides for the step of making on the second face 10*b* of the support circuit board 10, the grooves 18.

The method can further provide for fixing the lighting device to the wall of the support frame 5, for positioning the support frame 5 with the mini-LED lighting device coupled in the hull 2, for fixing the support frame 5 to the hull 2, for firmly coupling the mask frame 7 to the support frame 2, and for coupling the lenticular body 3 to the mouth of the hull 2.

The advantages of the automotive lighting appliance and of the method for manufacturing the lighting appliance are numerous.

The use of the mini-LED electronic modules in the mini-LED lighting device allows manufacturing a lighting appliance with a relatively high definition/resolution and with relatively reduced costs since the mini-LEDs have a very reduced pitch with respect to the lighting appliances manufactured with traditional LED matrixes or with segmented OLEDs.

The structure of the above-described mini-LED lighting device allows adapting the latter to three-dimensional shapes and thus following complex curvature profiles of the lighting appliance.

The mini-LED electronic modules which incorporate the driver for the manufacturing of the emitting mini-LED displays are usable for the manufacturing of automotive lighting appliances having different shapes and dimensions. In other words, the above-described modularity of the mini-LED lighting devices allows simplifying the manufacturing process of the lighting appliances, and not affecting the production costs since common pick and place production processes can be used for the mounting of drivers and mini-LED matrixes. Additionally, it is possible to validate each mini-LED electronic module as if it were a single electronic component since the control electronics, i.e. the driver is directly applied thereon and works also in stand-alone mode.

This allows analysing and improving the thermal, mechanical and electronic performances of the mini-LED electronic module.

The embodiment providing for the making of the grooves on the support board is further simple to manufacture and allows further simplifying the process and further reducing the manufacturing costs. Furthermore, the making of the cooling opening allows on the one hand increasing the space for the SMD components on the second face of the support circuit board and on the other hand favouring the heat dissipation. This allows manufacturing an emitting surface very adherent to the support circuit board and reducing the thickness and thus the bulk of the mini-LED lighting device inside the lighting appliance.

Furthermore, the communication carried out between the different LED drivers which uses a series communication protocol with the modules interconnected in daisy-chain allows reducing the number of messages/data sent from the electronic control unit 200 to the LED-drivers 14 for composing the image.

Furthermore, in the lighting appliance a constant pitch is maintained in the entire emitting surface and in particular in the joint points.

The invention claimed is:

1. Automotive lighting appliance (1) comprising an internal wall (4), and a mini-LED lighting device (6) which is coupled to said internal wall (4) and comprises:
    a support circuit board (10) formed by one or more support portions (25); and
    a plurality of flat plate-shaped mini-LED electronic modules (11), which are firmly coupled to said one or more support portions (25) of said support circuit board (10), next to each other, so as to form a light emitting surface (8) configured to emit light;
    wherein a mini-LED array (13) is formed by a matrix of the mini-LED lighting devices (6*a*);
    wherein the mini-LED array is formed by rectilinear lines and columns of the mini-LEDs (6*a*) that are aligned with each other, and
    wherein said one or more support portions (25) and the relative mini-LED electronic modules (11) from among the plurality of mini-LED electronic modules (11) form an emitting mini-LED display (9).

2. The automotive lighting appliance (1) according to claim 1, wherein said flat plate-shaped mini-LED electronic modules (11) are coupled to said one or more support portions (25) of the support circuit board (10) so as to form a light emitting surface (8) having a pre-established three-dimensional shape.

3. The automotive lighting appliance (1) according to claim 1, wherein the internal wall (4) has a three-dimensional shape, said one or more support portions (25) of the support circuit board (10) are coupled to said internal wall (4) so that the mini-LED electronic modules (11) form a light emitting surface (8) having a three-dimensional shape corresponding to the three-dimensional shape of said internal wall (4).

4. The automotive lighting appliance according to claim 1, wherein each mini-LED electronic module (11) comprises:
    a flat plate-shaped circuit base (12), which has a first surface firmly fixed to a first face (10*a*) of said support circuit board (10), and a second surface opposite the first surface,
    a mini-LED array (13) comprising a plurality of mini-LEDs (6*a*) which are arranged on said second surface of the circuit base (12) and have a pre-established pitch, with respect to each other,
    a LED-driver (14) which is firmly arranged on the first surface of the circuit base (12) and is electrically connected to the mini-LED array (13) of said mini-LED electronic module (11), the LED-driver (14) is configured to control said mini-LED array (13).

5. The automotive lighting appliance according to claim 4, wherein on said support circuit board (10) cooling through openings (26) are obtained which are positioned and dimensioned to house respective LED-drivers (14) of the mini-LED electronic modules (11).

6. The automotive lighting appliance according to claim 1, wherein
    the mini-LED electronic modules (11) have a polygonal shape,
    each mini-LED electronic module (11) has at least one outer side (11*a*) approximately in contact with an outer side (11*a*) of an adjacent mini-LED electronic module (11),
    the mini-LEDs (6*a*) arranged along said contacting outer side (11*a*) of a mini-LED electronic module (11) have a pitch with respect to the relative mini-LEDs (6*a*) arranged along the relative contacting outer side (11*a*)

of said adjacent mini-LED electronic module (11), equal to said pre-established pitch of the remaining mini-LEDs (6a).

7. The automotive lighting appliance (1) according to claim 1, wherein
said support circuit board (10) is composed of a plurality of support portions (25) which support a plurality of mini-LED electronic modules (11) and are arranged next to each other, so as to lie on respective lying planes which are tilted with respect to each other by pre-established angles that depend on said pre-established three-dimensional shape.

8. The automotive lighting appliance according to claim 7, wherein each said support portion (25) and the relative mini-LED electronic modules (11) form an emitting mini-LED display (9),
the emitting mini-LED display (9) is arranged adjacent to at least one other emitting mini-LED display (9) and has at least one outer side (9a) in contact with an outer side (9a) of the other emitting mini-LED display (9).

9. The automotive lighting appliance according to claim 8, wherein the outer sides (9a) of mutual contact of said adjacent emitting mini-LED displays (9) have respective tilted flat walls which rest against each other; each tilted flat wall lies on a plane which is tilted with respect to the lying plane of the relative emitting mini-LED display (9) by an angle that depends on said pre-established three-dimensional shape.

10. The automotive lighting appliance according to claim 8, wherein the outer sides (9a) of mutual contact of at least two adjacent emitting mini-LED displays (9) are connected to each other by means of a connecting edge obtained on said support circuit board (10),
said connecting edge is structured to allow a partial rotation of an emitting mini-LED display (9) with respect to the other emitting mini-LED display (9) along a common rectilinear folding line (LP) approximately coinciding with said outer sides (9a) of mutual contact of the two adjacent emitting mini-LED displays (9).

11. The automotive lighting appliance according to claim 10, wherein said connecting edge is obtained on said support circuit board (10) by means of a groove (18) which extends on a second face (10b) of said support circuit board (10) opposite said first face (10a), along said common folding line (LP).

12. The automotive lighting appliance according to claim 1, wherein the mini-LED lighting device (6) is without a liquid crystal panel.

13. Method for manufacturing an automotive lighting appliance (1) provided with an internal wall (4), and a mini-LED lighting device (6),
the method comprises the steps of:
providing a plate-shaped support board (10) comprising one or more support portions (25),
providing a plurality of flat plate-shaped mini-LED electronic modules (11),
firmly fixing the flat plate-shaped mini-LED electronic modules (11) to said one or more support portions (25) of said support board (10), next to each other,
coupling said one or more support portions (25) of the support circuit board (10) to said internal wall (4) so as to form an emitting surface (8) adapted to emit light;
wherein a mini-LED array (13) is formed by a matrix of the mini-LED lighting devices (6a);
wherein the mini-LED array is formed by rectilinear lines and columns of the mini-LEDs (6a) that are aligned with each other, and
wherein said one or more support portions (25) and the relative mini-LED electronic modules (11) from among the plurality of mini-LED electronic modules (11) form an emitting mini-LED display (9).

14. The method according to claim 13, comprising the step of coupling said flat plate-shaped mini-LED electronic modules (11) to said one or more support portions (25) of the support circuit board (10) so as to form a light emitting surface (8) having a pre-established three-dimensional shape.

15. The method according to claim 13, wherein said internal wall (4) has a three-dimensional shape, the method comprises the step of coupling said one or more support portions (25) of the support circuit board (10) to said internal wall (4) so as to arrange the mini-LED electronic modules (11) in positions such to form a light emitting surface (8) having a three-dimensional shape corresponding to the three-dimensional shape of said internal wall (4).

16. Automotive lighting appliance (1) comprising an internal wall (4), and a mini-LED lighting device (6) which is coupled to said internal wall (4) and comprises:
a support circuit board (10) formed by one or more support portions (25); and
a plurality of flat plate-shaped mini-LED electronic modules (11), which are firmly coupled to said one or more support portions (25) of said support circuit board (10), next to each other, so as to form a light emitting surface (8) adapted to emit light,
wherein said support circuit board (10) is composed of a plurality of support portions (25) which support a plurality of mini-LED electronic modules (11) and are arranged next to each other, so as to lie on respective lying planes which are tilted with respect to each other by pre-established angles that depend on said pre-established three-dimensional shape;
wherein each said support portion (25) and the relative mini-LED electronic modules (11) form an emitting mini-LED display (9); and
wherein the emitting mini-LED display (9) is arranged adjacent to at least one other emitting mini-LED display (9) and has at least one outer side (9a) in contact with an outer side (9a) of the other emitting mini-LED display (9).

* * * * *